(12) United States Patent
Naruse et al.

(10) Patent No.: US 9,826,150 B2
(45) Date of Patent: Nov. 21, 2017

(54) SIGNAL PROCESSING DEVICE, IMAGING APPARATUS, PARAMETER GENERATING METHOD, SIGNAL PROCESSING METHOD, AND PROGRAM

(71) Applicant: FUJIFILM Corporation, Tokyo (JP)

(72) Inventors: Yousuke Naruse, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 36 days.

(21) Appl. No.: 15/135,948

(22) Filed: Apr. 22, 2016

(65) Prior Publication Data

US 2016/0241779 A1 Aug. 18, 2016

Related U.S. Application Data

(63) Continuation of application No. PCT/JP2014/076068, filed on Sep. 30, 2014.

(30) Foreign Application Priority Data

Oct. 31, 2013 (JP) ................................. 2013-227390

(51) Int. Cl.
*H04N 5/232* (2006.01)
*G06T 5/00* (2006.01)

(52) U.S. Cl.
CPC ......... *H04N 5/23229* (2013.01); *G06T 5/007* (2013.01)

(58) Field of Classification Search
CPC ........................... H04N 5/23229; G06T 5/007
See application file for complete search history.

(56) References Cited

U.S. PATENT DOCUMENTS 4,719,350 A * 1/1988 Alm .................. H04N 5/33
250/330
4,918,543 A * 4/1990 Petilli ................ H04N 1/4092
358/3.22

(Continued)

FOREIGN PATENT DOCUMENTS

JP 2004-133912 A 4/2004
JP 2005-117298 A 4/2005

(Continued)

OTHER PUBLICATIONS

International Preliminary Report on Patentability for PCT/JP2014/076068 dated May 3, 2016, with an English Translations thereof.

(Continued)

*Primary Examiner* — David F Dunphy
(74) *Attorney, Agent, or Firm* — Birch, Stewart, Kolasch & Birch, LLP

(57) ABSTRACT

There are provided a signal processing device, an imaging apparatus, a parameter generating method, a signal processing method, and a program that enable desired frequency component adjustment without complicating the processing. An image processing unit 35 includes a signal processing section that adjusts a signal according to a frequency and a filter processing control section 37 (automatic strength adjustment section 52) that controls the signal processing section. The signal processing section includes a first filter processing section 38 that performs first filter processing and a second filter processing section 39 that performs second filter processing. The automatic strength adjustment section 52 acquires the adjustment magnification (first gain adjustment magnification U and second gain adjustment magnification V) in one of the first filter processing and the second filter processing, and calculates the adjustment magnifica- (Continued)

tion in the other processing based on a total gain adjustment rate D.

17 Claims, 10 Drawing Sheets

(56) References Cited

U.S. PATENT DOCUMENTS

| | | | | |
|---|---|---|---|---|
| 6,445,830 B1* | 9/2002 | Gilling | ............... | G06T 5/10 382/128 |
| 7,984,093 B1* | 7/2011 | Tu | ............... | H03H 11/20 708/819 |
| 2006/0093233 A1 | 5/2006 | Kano et al. | | |
| 2006/0291841 A1 | 12/2006 | Fukumoto et al. | | |
| 2008/0266413 A1* | 10/2008 | Cohen | ............... | G06T 5/20 348/222.1 |
| 2010/0045820 A1* | 2/2010 | Prieto | ............... | H04N 5/2352 348/229.1 |
| 2010/0330947 A1* | 12/2010 | Khoury | ............... | H04B 1/28 455/302 |
| 2011/0123134 A1* | 5/2011 | Leitao | ............... | G06T 5/008 382/274 |
| 2011/0135216 A1 | 6/2011 | Hatakeyama | | |

FOREIGN PATENT DOCUMENTS

| | | |
|---|---|---|
| JP | 2006-129236 A | 5/2006 |
| JP | 2006-333061 A | 12/2006 |
| JP | 2009-27750 A | 2/2009 |
| JP | 2009-171320 A | 7/2009 |
| JP | 2011-123589 A | 6/2011 |
| JP | 2012-199692 A | 10/2012 |

OTHER PUBLICATIONS

International Search Report for PCT/JP2014/076068 (PCT/ISA/210) dated Jan. 6, 2015.
Written Opinion of the International Searching Authority for PCT/JP2014/076068 (PCT/ISA/237) dated Jan. 6, 2015.

* cited by examiner

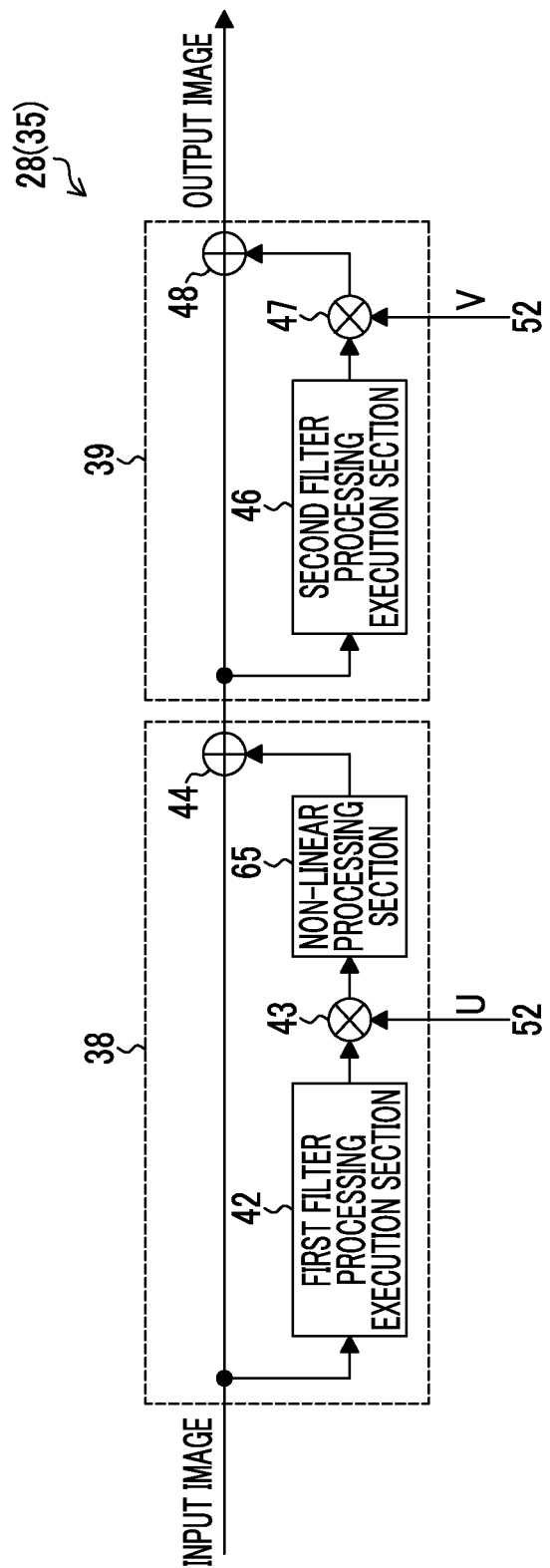

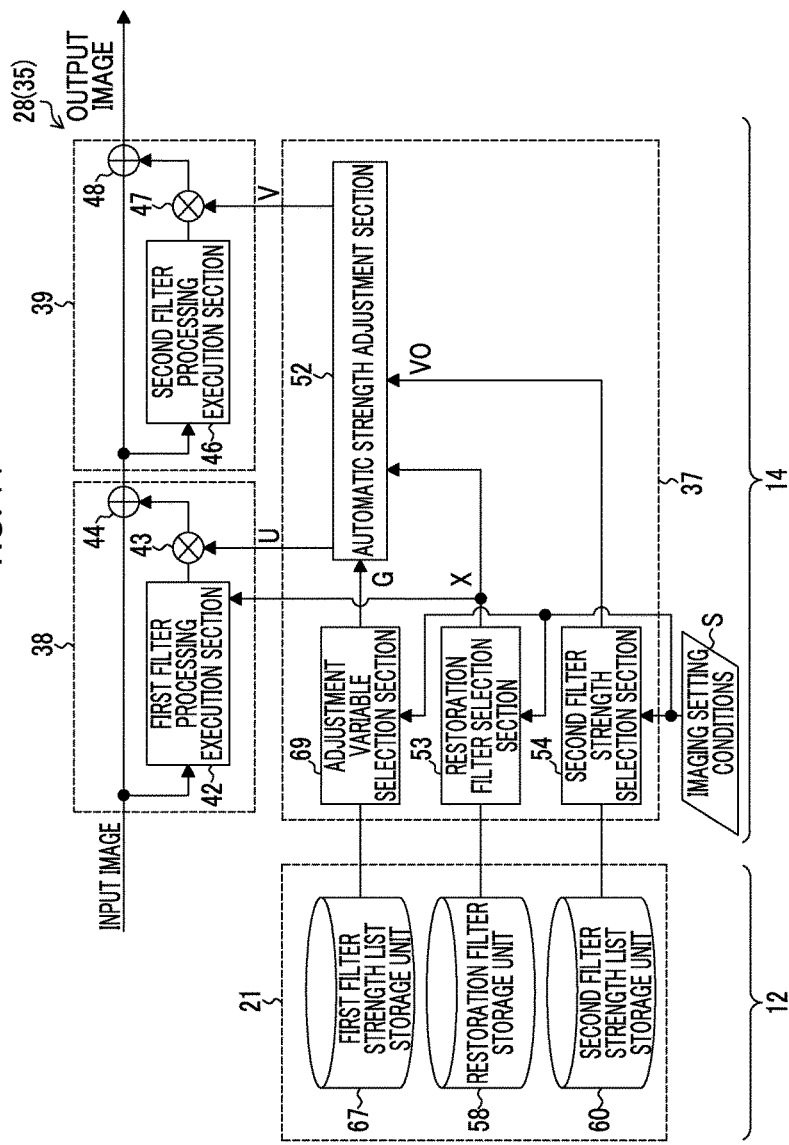

SIGNAL PROCESSING DEVICE, IMAGING APPARATUS, PARAMETER GENERATING METHOD, SIGNAL PROCESSING METHOD, AND PROGRAM

CROSS-REFERENCE TO RELATED APPLICATIONS

This application is a Continuation of PCT International Application No. PCT/JP2014/076068 filed on Sep. 30 2014, which claims priority under 35 U.S.C §119(a) to Patent Application No. 2013-227390 filed in Japan on Oct. 31, 2013, all of which are hereby expressly incorporated by reference into the present application.

BACKGROUND OF THE INVENTION

1. Field of the Invention

The present invention relates to a signal processing device, an imaging apparatus, a parameter generating method, a signal processing method, and a program, and in particular, relates to a technique for adjustment between a plurality of filter processes.

2. Description of the Related Art

As signal processing for changing and improving the quality of an image, filter processing, such as sharpening processing (outline enhancement processing, edge enhancement processing, or sharpness enhancement processing), point image restoration processing, and low pass processing, is generally known. Such filter processing is processing for emphasizing or suppressing the signal strength at a specific frequency by applying a filter to the signal, and the signal strength is adjusted according to the frequency characteristics of a filter to be used.

Accordingly, since an image signal having desired characteristics can be obtained by appropriately combining filter processes, these filter processes are used in order to achieve various objects.

For example, JP2011-123589A discloses image processing using an image restoration filter for reducing a phase degradation component and an edge enhancement filter for reducing an amplitude degradation component. JP2006-333061A discloses performing "image stabilization for performing edge enhancement processing after performing image restoration processing using an image restoration filter" and "image stabilization for simply performing edge enhancement processing". JP2009-27750A discloses determining the degree of enhancement of outline components of a video signal according to conditions, such as a diaphragm at the time of imaging. JP2006-129236A discloses changing the strength of a restoration filter itself according to the edge strength by selecting filters having different restoration strengths according to the edge strength. JP2009-171320A discloses an imaging apparatus that performs appropriate noise removal corresponding to the focal length by adjusting the degree of noise reduction by a noise reduction (NR) processing unit and the degree of edge enhancement by an edge enhancement processing unit.

SUMMARY OF THE INVENTION

As an image quality adjusting method, for example, a method of calculating difference data from original image data by applying a filter to the original image data, taking an integer multiple of the difference data, and adding the difference data obtained by the integer multiplication to the original image data is generally known. This method can be carried out very easily since the image sharpness is improved by uniformly taking an integer multiple of the degree of emphasis (difference data) of the image regardless of the frequency. In this method, however, the frequency components of the emphasized image are limited to the integer multiple of the frequency characteristics of the filter. For this reason, it is not possible to perform fine adjustment of sharpness, such as changing the balance of emphasis between the high frequency component and the low-frequency component.

In addition, by providing a user interface for enabling changing the frequency characteristics of a filter, it is possible to change the balance of the image sharpness based on the frequency according to the needs of the user. If the frequency characteristics of the filter can be freely changed, the number of parameters (degree of freedom, axis) that can be operated by the user is increased, and the image sharpness is determined by the combination of such parameters. Therefore, in order to obtain an optimal image sharpness, the user needs to set each of a plurality of parameters appropriately in consideration of the correlation between the plurality of parameters. However, adjusting the image sharpness depending on the frequency in consideration of the balance between frequencies is a burden on the user. In addition, since the configuration of the user interface becomes complicated, the image sharpness adjustment processing becomes complicated.

Such complication of sharpening processing is concerned not only in a case where filter application processing includes only simple linear processing but also in a case where filtering processing includes non-linear processing, and there is a possibility that the number of parameters (degree of freedom of adjustment) that the user needs to adjust may be excessively increased. Therefore, a method for appropriately controlling the frequency components of the signal without complicating the effort of the user is required. In the conventional techniques disclosed in JP2011-123589A, JP2006-333061A, JP2009-27750A, JP2006-129236A, JP2009-171320A, and the like, however, no useful proposals for a technique for making "flexible control for obtaining the desired sharpening effect" and "simple operability" compatible with each other have been made.

The present invention has been made in view of the aforementioned situation, and it is an object of the present invention to provide a signal processing method that enables desired frequency component adjustment without complicating processing and relevant techniques.

An aspect of the present invention relates to a signal processing device including a signal processing unit that adjusts a signal according to a frequency and a filter processing control unit that controls the signal processing unit. The signal processing unit includes a first filter processing section that performs first filter processing and a second filter processing section that performs second filter processing having different frequency characteristics from the first filter processing. The filter processing control unit acquires a total gain adjustment rate based on an adjustment magnification of a gain of the signal in the first filter processing and an adjustment magnification of a gain of the signal in the second filter processing, acquires the adjustment magnification in one of the first filter processing and the second filter processing, and calculates the adjustment magnification in the other one of the first filter processing and the second filter processing based on the total gain adjustment rate.

According to this aspect, since the adjustment magnification in the other processing is calculated by acquiring the adjustment magnification in one of the first filter processing and the second filter processing, it is possible to adjust the frequency component of the signal by the first filter processing and the second filter processing according to the simple process flow.

Preferably, the filter processing control unit adjusts a ratio between the signals before and after the signal processing unit to a response target ratio at a first frequency.

According to this aspect, since the ratio between the signals before and after the signal processing unit is adjusted to the response target ratio at the first frequency, it is possible to secure desired signal characteristics at least at the first frequency.

Although the "first frequency" is not particularly limited, a frequency that is more important than other frequencies can be set as the "first frequency". For example, in a case where the signal to be processed is an image signal, it is possible to perform the first filter processing and the second filter processing in a state in which visibility is secured by setting a frequency, which greatly affects the viewing of the user, as the "first frequency".

Preferably, a frequency band where it is possible to adjust signals overlaps at least partly between the first filter processing and the second filter processing, and a frequency indicating the peak of the gain is different between the first filter processing and the second filter processing.

Various kinds of signal processing can be performed by combining the first filter processing and the second filter processing having different frequency characteristics as in this aspect.

Preferably, the first filter processing includes processing for applying a first filter to the signal and processing for adjusting a magnification of a gain of the signal, which is obtained by application of the first filter, based on the adjustment magnification, and the second filter processing includes processing for applying a second filter to the signal and processing for adjusting a magnification of a gain of the signal, which is obtained by application of the second filter, based on the adjustment magnification.

According to this aspect, it is possible to perform the first filter processing and the second filter processing through a simple processing configuration.

Preferably, the filter processing control unit determines the adjustment magnification in the first filter processing based on an external input parameter, and calculates the adjustment magnification in the second filter processing based on the adjustment magnification in the first filter processing and the total gain adjustment rate.

According to this aspect, the adjustment magnification in the second filter processing can be automatically calculated from the adjustment magnification in the first filter processing and the total gain adjustment rate.

The "external input parameter" may be a parameter input by the user, or may be a parameter input from a section other than the first filter processing section. In addition, the external input parameter may be set as the "adjustment magnification in the first filter processing", and the value derived from the external input parameter according to a specific algorithm may be set as the "adjustment magnification in the first filter processing".

Preferably, the first filter processing section and the second filter processing section are provided in parallel, the signal is input to the first filter processing section and the second filter processing section, and increment or decrement data of the signal due to the first filter processing and increment or decrement data of the signal due to the second filter processing are added together.

Even if the first filter processing section and the second filter processing section are provided in parallel as in this aspect, it is possible to adjust the frequency component of the signal by the first filter processing and the second filter processing according to the simple process flow.

Preferably, the first filter processing section and the second filter processing section are provided in series, and the signal is subjected to one of the first filter processing and the second filter processing and is then subjected to the other processing.

Even if the first filter processing section and the second filter processing section are provided in series as in this aspect, it is possible to adjust the frequency component of the signal by the first filter processing and the second filter processing according to the simple process flow.

Preferably, at least any one of the first filter processing section or the second filter processing section includes a non-linear processing section that performs non-linear processing of the signal.

Even if non-linear processing is included in the signal processing system as in this aspect, it is possible to adjust the frequency component of the signal by the first filter processing and the second filter processing according to the simple process flow.

The "non-linear processing" is processing that is not configured to include only linear operations, and may include not only processing of addition, subtraction, multiplication, and division but also processing including referring to a look-up table (LUT) or conditional branching, for example.

Preferably, the non-linear processing is clipping processing for adjusting a signal value exceeding a clip threshold value of the signal to the clip threshold value, and the filter processing control unit determines the adjustment magnification in at least any one of the first filter processing or the second filter processing according to the clip threshold value.

Even in a case where clipping processing is performed as in this aspect, it is possible to adjust the frequency component of the signal by the first filter processing and the second filter processing according to the simple process flow.

Preferably, at least any one of the first filter processing or the second filter processing is low pass filter processing.

According to this aspect, it is possible to adjust the frequency component of the signal by the low pass filter processing.

Preferably, the signal is an image signal.

According to this aspect, it is possible to adjust the frequency component of the image signal by the first filter processing and the second filter processing.

Preferably, the first filter processing is restoration processing using a restoration filter based on a point spread function, and the restoration filter is determined based on imaging setting conditions in imaging and acquisition of the image signal.

According to this aspect, even in the case of processing the signal by the restoration processing using a restoration filter based on the point spread function, it is possible to adjust the frequency component of the signal by the first filter processing and the second filter processing according to the simple process flow. The "restoration filter based on the point spread function" is a restoration filter based on an inverse filter, a Wiener filter, or the like generated using the point spread function (PSF) of the optical system, and the "restoration processing" includes processing for applying such a restoration filter to image data. The "point spread function" is a function showing a response to a point light source of the optical system, and can be expressed based on the PSF and an OTF (modulation transfer function (MTF), and a phase transfer function (PTF)).

In addition, the "point spread function" is not limited to a function showing the response to the point light source of the optical system, and may be a function reflecting the amount of movement of the subject (for example, the amount of movement of the subject due to camera shake, subject shake, or the like) that is detected at the time of imaging of the imaging apparatus. Therefore, since the "restoration filter based on the point spread function" is a restoration filter generated using the point spread function, the "restoration filter based on the point spread function" may be a filter for reducing shake blur (camera shake blur, subject shake blur, or the like).

Preferably, the second filter processing is sharpening processing using a sharpening filter.

According to this aspect, even in the case of processing the signal by the sharpening processing, it is possible to adjust the frequency component of the signal by the first filter processing and the second filter processing according to the simple process flow. As the "sharpening filter", it is possible to use filters other than a "filter (restoration filter) generated using an inverse filter or a Wiener filter from the point spread function (PSF) of the optical system". Accordingly, as the "sharpening filter", for example, a filter that is not based on the point spread function of the optical system can be appropriately used. A filter calculated based on elements (parameters) other than the point spread function can be adopted as the "sharpening filter". As the sharpening filter that is not based on the point spread function, a filter that is switchable according to a diaphragm value having a different point spread function or the like can be adopted as a sharpening filter if the filter is a filter created without depending on the point spread function. Similarly, a filter that is switchable according to an image height having a different point spread function can be adopted as a sharpening filter. The strength (gain) of the sharpening filter in the sharpening processing may be changed according to the diaphragm value or the image height.

The "sharpening processing" is processing for compensating for or emphasizing high frequency components of image data, and is processing for emphasizing outline components of the image. Accordingly, for example, processing called outline enhancement processing, edge enhancement processing, or sharpness enhancement processing is included in the "sharpening processing" referred to herein.

Preferably, the adjustment magnification in at least any one of the first filter processing or the second filter processing is determined based on imaging setting conditions in imaging and acquisition of the image signal.

According to this aspect, at least any one of the first filter processing or the second filter processing can be made to be processing that reflects the imaging setting conditions.

Another aspect of the present invention relates to an imaging apparatus including the signal processing device described above.

Still another aspect of the present invention relates to a parameter generating method for generating a parameter used in an image processing unit which includes a signal processing unit that adjusts a signal according to a frequency and a filter processing control unit that controls the signal processing unit and in which the signal processing unit includes a first filter processing section that performs first filter processing and a second filter processing section that performs second filter processing and frequency characteristics are different between the first filter processing and the second filter processing. The parameter generating method includes: a step of acquiring a total gain adjustment rate based on an adjustment magnification of a gain of the signal in the first filter processing and an adjustment magnification of a gain of the signal in the second filter processing; and a step of acquiring the adjustment magnification in one of the first filter processing and the second filter processing and calculating the adjustment magnification in the other one of the first filter processing and the second filter processing based on the total gain adjustment rate.

Still another aspect of the present invention relates to a signal processing method including: a signal adjustment step of adjusting a signal according to a frequency, the signal adjustment step including a first filter processing step of performing first filter processing and a second filter processing step of performing second filter processing having different frequency characteristics from the first filter processing: a step of acquiring a total gain adjustment rate based on an adjustment magnification of a gain of the signal in the first filter processing and an adjustment magnification of a gain of the signal in the second filter processing; and a step of acquiring the adjustment magnification in one of the first filter processing and the second filter processing and calculating the adjustment magnification in the other one of the first filter processing and the second filter processing based on the total gain adjustment rate.

Still another aspect of the present invention relates to a program causing a computer to execute: a procedure of adjusting a signal according to a frequency, the procedure including a step of performing first filter processing and a step of performing second filter processing having different frequency characteristics from the first filter processing: a procedure of acquiring a total gain adjustment rate based on an adjustment magnification of a gain of the signal in the first filter processing and an adjustment magnification of a gain of the signal in the second filter processing; and a procedure of acquiring the adjustment magnification in one of the first filter processing and the second filter processing and calculating the adjustment magnification in the other one of the first filter processing and the second filter processing based on the total gain adjustment rate.

According to the present invention, since the adjustment magnification in the other processing is calculated by acquiring the adjustment magnification in one of the first filter processing and the second filter processing, it is possible to adjust the frequency component of the signal by the first filter processing and the second filter processing according to the simple process flow.

BRIEF DESCRIPTION OF THE DRAWINGS

FIG. 6A shows an example of the "frequency-gain" relationship in the first filter processing (first filter processing section), FIG. 6B shows an example of the "frequency-gain" relationship in the second filter processing (second filter processing section), and FIG. 6C shows an example of the "frequency-gain" relationship in all of the first filter processing and the second filter processing (signal processing section).

FIG. 8 is a diagram showing the configuration of an image processing block according to a fourth embodiment.

FIG. 9A shows an example of the "frequency-gain" relationship in the first filter processing (first filter processing section) and FIG. 9B shows an example of the "frequency-gain" relationship in the second filter processing (second filter processing section).

FIG. 10A is a diagram showing an example of adjustment for the high contrast waveform signal and FIG. 10B is a diagram showing an example of adjustment for the low contrast waveform signal.

FIG. 11 is a diagram showing the configuration of an image processing block according to a modification example.

DESCRIPTION OF THE PREFERRED EMBODIMENTS

Embodiments of the present invention will be described with reference to the accompanying diagrams. In the following embodiments, a case where the present invention is applied to a digital camera (imaging apparatus) including an image processing device (signal processing device) will be described as an example. Here, the present invention can also be similarly applied to a signal processing device and a signal processing method for processing signals (for example, an audio signal) other than an image signal.

Figure 1:
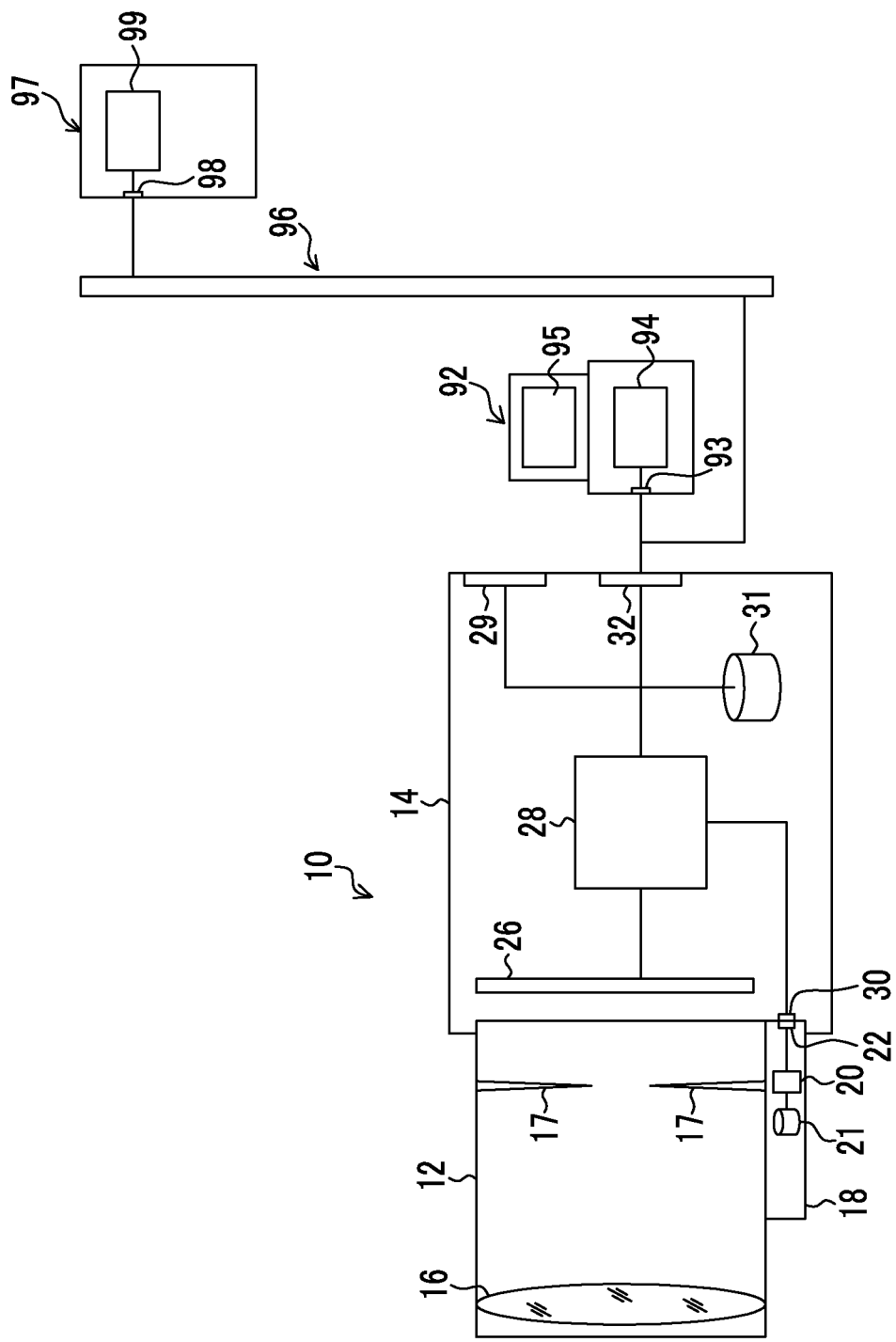
FIG. 1 is a block diagram showing a digital camera connected to a computer.

FIG. 1 is a block diagram showing a digital camera connected to a computer. In a digital camera 10 in this example, a lens unit 12 that is an example of the optical system is replaceably attached to a camera body (imaging body) 14 in which an imaging element 26 is mounted, and an image processing device is provided in the camera body 14.

That is, the digital camera 10 includes the replaceable lens unit 12 and the camera body 14 that includes the imaging element 26, and the lens unit 12 and the camera body 14 are electrically connected to each other through a lens unit input and output section 22 of the lens unit 12 and a camera body input and output unit 30 of the camera body 14.

The lens unit 12 includes a lens 16 and a diaphragm 17, which form an optical system, and an optical system operation unit 18 that controls the optical system. The optical system operation unit 18 includes a lens unit controller 20 connected to the lens unit input and output section 22, a lens unit storage unit 21 that stores various kinds of information (optical system information or the like), and an actuator (not shown) to operate the optical system. The lens unit controller 20 controls the optical system through the actuator based on a control signal transmitted through the lens unit input and output section 22 from the camera body 14. For example, the lens unit controller 20 performs focus control or zoom control by lens movement, control of the amount of diaphragm of the diaphragm 17, and the like. In addition, the lens unit controller 20 reads out various kinds of information stored in the lens unit storage unit 21 based on the control signal transmitted through the lens unit input and output section 22 from the camera body 14, and transmits the information to the camera body 14 (body controller 28).

The imaging element 26 of the camera body 14 includes a condensing microlens, color filters of red (R), green (G), and blue (B), and image sensors (photodiodes; a complementary metal oxide semiconductor (CMOS), a charge coupled device (CCD), and the like). The imaging element 26 converts light of a subject image, which is emitted through the optical system (the lens 16, the diaphragm 17, and the like) of the lens unit 12, into an electrical signal, and transmits an image signal (original image data) to the body controller 28.

Although details will be described later (refer to FIG. 2), the body controller 28 has a function as a device control unit that performs overall control of each unit of the digital camera 10 and a function as an image processing unit that performs image processing of image data transmitted from the imaging element 26.

The digital camera 10 further includes other devices (shutter and the like) required for imaging or the like, and some of the devices form a user interface 29 that can be checked and operated by the user. The user interface 29 can be disposed in the lens unit 12 and/or the camera body 14. In the example shown in FIG. 1, the user interface 29 is provided in the camera body 14. Through the user interface 29, the user can determine and change various settings (exposure value (EV) value and the like) for imaging or the like, give an imaging instruction, check a live preview image and a captured image, and the like. The user interface 29 is connected to the body controller 28, and various setting determined and changed by the user and various instructions are reflected in various processes (device control processing, image processing, and the like) in the body controller 28.

Image data subjected to the image processing in the body controller 28 is stored in a main body storage unit 31 provided in the camera body 14, and is transmitted to a computer 92 or the like through an input and output interface 32 when necessary. The main body storage unit 31 is formed by an arbitrary memory body, and a replaceable memory, such as a memory card, is appropriately used. The format of the image data output from the body controller 28 is not particularly limited, and can be any format, such as RAW, joint photographic experts group (JPEG), and tagged image file format (TIFF). The body controller 28 may form header information (imaging information (imaging date and time, a model, the number of pixels, a diaphragm value, and the like)) and a plurality of pieces of associated data, such as main image data and thumbnail image data, as one image file so as to be associated with each other as a so-called exchangeable image file format (Exif), and output the image file.

The computer 92 is connected to the digital camera 10 through the input and output interface 32 of the camera body 14 and a computer input and output unit 93, and receives data, such as the image data transmitted from the camera body 14. A computer controller 94 performs overall control of the computer 92, performs image processing on the image data from the digital camera 10, and controls communication with a server 97 or the like connected to the computer input and output unit 93 through a network line, such as the Internet 96. The computer 92 includes a display 95, and the content of processing in the computer controller 94 or the like is displayed on the display 95 when necessary. The user can input data or a command to the computer controller 94 by operating input means (not shown), such as a keyboard, while checking the display of the display 95. Therefore, the user can control the computer 92 or devices (the digital camera 10 and the server 97) connected to the computer 92.

The server 97 includes a sever input and output unit 98 and a server controller 99. The sever input and output unit 98 forms a connection unit for transmission and reception of signals to and from an external device, such as the computer 92, and is connected to the computer input and output unit 93 of the computer 92 through a network line, such as the Internet 96. In response to the control signal from the computer 92, the server controller 99 transmits and receives data to and from the computer controller 94, when necessary, in cooperation with the computer controller 94, downloads the data to the computer 92, performs arithmetic processing, and transmits the calculation result to the computer 92.

Each controller (the lens unit controller 20, the body controller 28, the computer controller 94, and the server controller 99) includes circuits required for control processing, for example, a central processing unit (CPU) or a memory. Communication between the digital camera 10, the computer 92, and the server 97 may be performed through a wired line or wirelessly. The computer 92 and the server 97 may be integrally formed, and the computer 92 and/or the server 97 may be omitted. The digital camera 10 may be made to have a function of communication with the server 97, so that the transmission and reception of data are directly performed between the digital camera 10 and the server 97.

Figure 2:
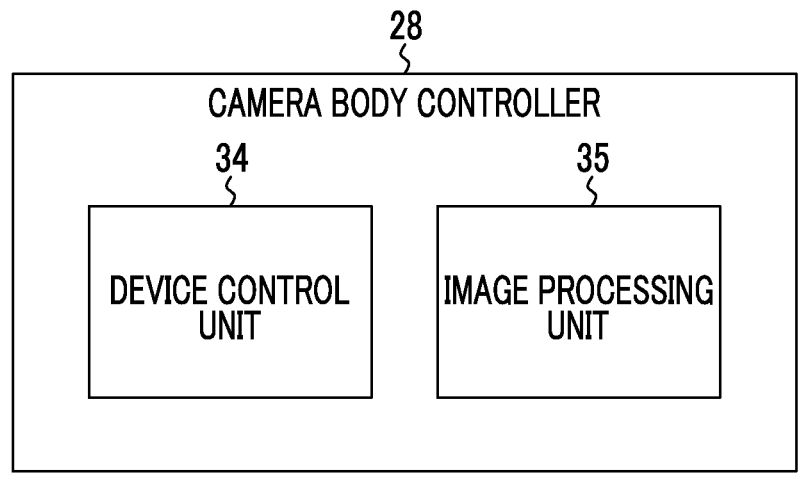
FIG. 2 is a block diagram showing an example of the configuration of a body controller.

FIG. 2 is a block diagram showing an example of the configuration of the body controller 28. The body controller 28 includes a device control unit 34 and an image processing unit 35, and performs overall control of the camera body 14.

The device control unit 34 controls the output of an image signal (image data) from the imaging element 26, generates a control signal for controlling the lens unit 12 and transmits the control signal to the lens unit 12 (lens unit controller 20) through the camera body input and output unit 30, stores image data before and after image processing (RAW data, JPEG data, or the like) in the main body storage unit 31, and transmits the image data before and after image processing (RAW data, JPEG data, or the like) to an external device (computer 92 or the like) connected through the input and output interface 32, for example. In addition, the device control unit 34 appropriately controls various devices provided in the digital camera 10, such as a display unit (an electronic view finder (EVF), a back liquid crystal display unit: user interface 29).

On the other hand, the image processing unit 35 performs arbitrary image processing on the image signal from the imaging element 26 when necessary. Various kinds of image processing, for example, sensor correction processing, demosaic (synchronization) processing, pixel interpolation processing, color correction processing (offset correction processing, white balance processing, color matric processing, gamma conversion processing, and the like), RGB image processing (sharpness processing, tone correction processing, exposure correction processing, outline correction processing, and the like), RGB/YCrCb conversion processing, and image compression processing are appropriately performed in the image processing unit 35. In particular, the image processing unit 35 in this example performs sharpening processing (outline enhancement processing), which is not based on the point spread function of the optical system, on the image signal (image data).

Figure 3:
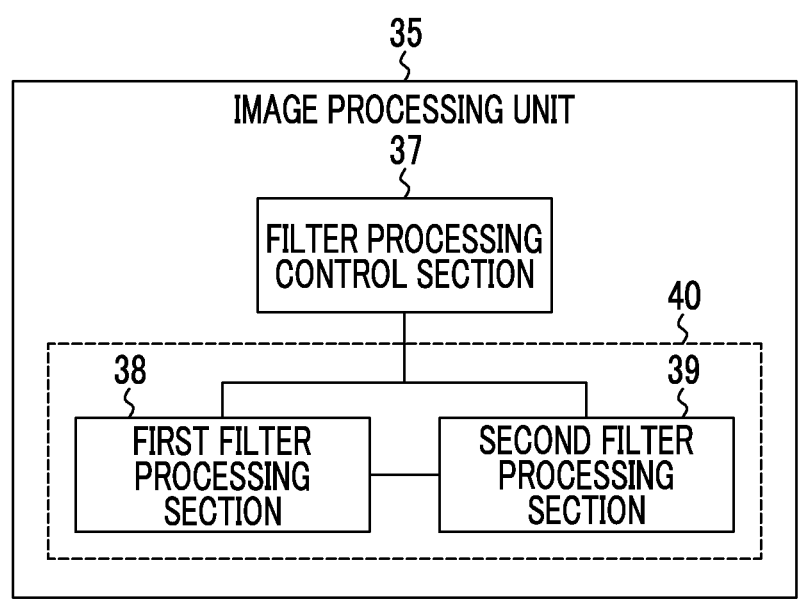
FIG. 3 is a block diagram showing an example of the configuration of an image processing unit.

FIG. 3 is a block diagram showing an example of the configuration of the image processing unit 35.

The image processing unit 35 in this example includes a signal processing section 40 that adjusts a signal according to a frequency and a filter processing control section 37 that controls the signal processing section 40. The signal processing section 40 (signal adjustment step) includes a first filter processing section 38 (first filter processing step) that performs first filter processing and a second filter processing section 39 (second filter processing step) that performs second filter processing having different frequency characteristics from the first filter processing.

Arbitrary image processing filters can be used for the first filter processing and the second filter processing, and a two-dimensional finite impulse response (FIR) filter is appropriately used. As a simple example of the first filter processing and the second filter processing, it is possible to mention processing for calculating a signal gain by applying a filter to a signal to be processed (filter processing), adjusting the magnification of the signal gain (gain control processing), and adding the signal gain after magnification adjustment to the original signal.

Therefore, various kinds of processes, such as point image restoration processing, sharpening processing, and low pass filter processing, can be set as both or one of the first filter processing and the second filter processing. The first filter processing and the second filter processing may be filter processes for the same purpose, or may be filter processes for different purposes. For example, FIR filter signal processing for arbitrary sharpness enhancement processing (sharpening processing) may be set as the first filter processing and the second filter processing.

In the following example, the first filter processing and the second filter processing are assumed to be "sharpening processing using a sharpening filter". That is, the first filter processing section 38 and the second filter processing section 39 perform sharpening processing using a sharpening filter on the input image signal (outline enhancement processing step). The sharpening filter used in the first filter processing section 38 and the second filter processing section 39 is not particularly limited, and a known outline enhancement filter can be used as the sharpening filter. The sharpening filter may be a single filter determined in advance, or may be a filter selected from a plurality of filters according to the imaging setting conditions (an example of optical characteristics information). Therefore, for example, the filter processing control section 37, the first filter processing section 38, or the second filter processing section 39 may determine an optimal sharpening filter based on the imaging setting conditions. For each of the restoration filter and the sharpening filter, a single sharpening filter may be prepared for the entire image, or different sharpening filters may be prepared for each position (each image height) in the image. Here, a frequency band where it is possible to adjust signals overlaps at least partly between the first filter processing and the second filter processing, and a frequency indicating the peak of the gain is different between the first filter processing and the second filter processing.

The "imaging setting conditions" referred to herein may include, for example, "setting conditions", such as diaphragm information, zoom information, subject distance information, and lens type information, and "imaging conditions", such as imaging sensitivity information and imaging mode information.

The filter processing control section 37 controls the first filter processing section 38 and the second filter processing section 39. The filter processing control section 37 in this example acquires a total gain adjustment rate based on the adjustment magnification of the gain of a signal in the first filter processing and the adjustment magnification of the gain of a signal in the second filter processing. In addition, the filter processing control section 37 acquires the adjustment magnification in one of the first filter processing and the second filter processing, and calculates the adjustment magnification in the other one of the first filter processing and the second filter processing based on the total gain adjustment rate. Therefore, in a case where the first filter processing section 38 and the second filter processing section 39 perform sharpening processing, the filter processing control section 37 adjusts the magnification of the signal gain of the sharpening processing according to the first filter processing and the second filter processing based on the total gain adjustment rate.

Figure 4:
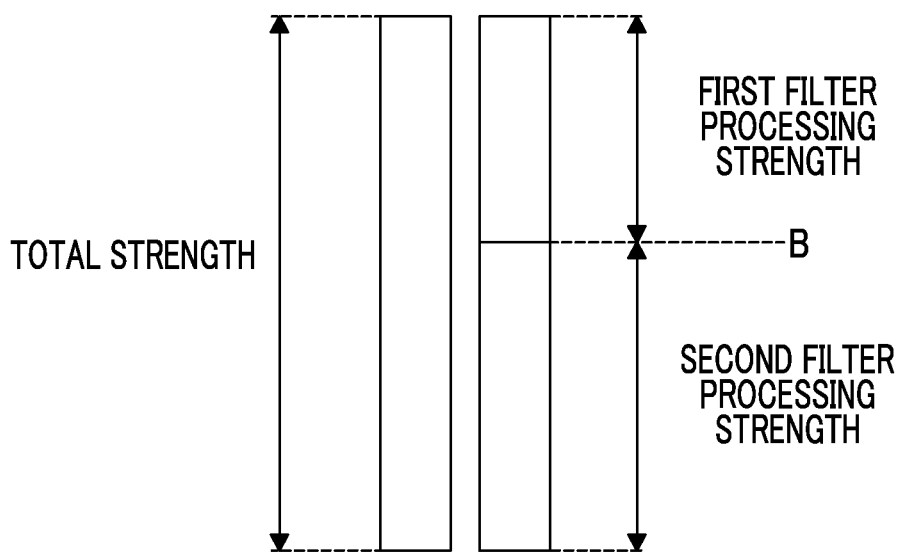
FIG. 4 is a conceptual diagram illustrating the adjustment of the filter processing strength.

FIG. 4 is a conceptual diagram illustrating the adjustment of the filter processing strength. The "total strength" in FIG. 4 is a final sharpness target strength value determined from the desired image quality, and shows directly or indirectly the magnitude ratio between the input and the output for the entire image processing. Although the "total strength" in this example may change according to the imaging setting conditions (an example of optical characteristics information), the "total strength" becomes a fixed value if the imaging setting conditions (an example of optical characteristics information) are determined. In addition, the "first filter processing strength" is the sharpening strength in the first filter processing, and the "second filter processing strength" is the sharpening strength in the second filter processing.

The total strength, the first filter processing strength, and the second filter processing strength are indices indicating the degree of signal change before and after signal processing, and are determined according to any of the criteria that can appropriately express the degree of change in the signal. Therefore, in a case where each of the first filter processing and the second filter processing includes filter application processing and gain control processing, changes before and after the "filter application processing and the gain control processing" are expressed by the first filter processing strength and the second filter processing strength.

For example, a case is assumed in which the first filter processing and the second filter processing are performed in parallel and the "first filter processing strength" and the "second filter processing strength" are determined by the "total strength". In this case, since the relationship of "first filter processing strength+second filter processing strength=total strength" is satisfied and the second filter processing strength is increased or decreased by the amount of increase or decrease in the first filter processing strength, a boundary position (B) between the first filter processing strength and the second filter processing strength shown in FIG. 4 may be changed. Therefore, for example, if the total strength and the first filter processing strength are determined, it is possible to calculate the optimal second filter processing strength from both the total strength and the first filter processing strength. Similarly, if the total strength and the second filter processing strength are determined, it is possible to calculate the optimal first filter processing strength from both the total strength and the second filter processing strength.

FIG. 4 just shows an intuitive conceptual diagram for easy understanding, and does not indicate that the relationship of "first filter processing strength+second filter processing strength=total strength" is always satisfied in the processing system that performs the first filter processing and the second filter processing. For example, in a case where the first filter processing and the second filter processing are performed in series, the total strength is determined based on the product of the first filter processing strength and the second filter processing strength. Therefore, in the following embodiments, the first filter processing strength and the second filter processing strength are determined so that the "frequency amplification factor based on both the first filter processing strength and the second filter processing strength" matches the "frequency amplification factor based on the total strength".

The adjustment of the first filter processing strength and the second filter processing strength can be performed based on various criteria. For example, the total strength can be determined so that the frequency amplification factor in image components in a specific frequency range is the same.

By adjusting the first filter processing strength and the second filter processing strength by setting the total strength as described above, it is possible to suppress a variation in the sharpness (sense of resolution) of the image subjected to the first filter processing and the second filter processing. Therefore, it is possible to improve the overall quality of the output image (signal).

Although the case has been described above in which the first filter processing section 38 and the second filter processing section 39 perform the same type of filter processing (sharpening processing) having different frequency characteristics, the first filter processing strength and the second filter processing strength can also be similarly adjusted in the case of performing different types of filter processes. For example, in a case where the first filter processing section 38 performs point image restoration processing and the second filter processing section 39 performs sharpening processing, it is possible to set the first filter processing strength preferentially and adjust the second filter processing strength according to the first filter processing strength. In this case, it is possible to accurately perform the point image restoration processing according to the PSF of the optical system (lens 16 or the like). The point image restoration processing is delicate processing, and may cause adverse effects, such as overcorrection, if the basic parameters are not correct. However, it is possible to effectively prevent the adverse effects, such as overcorrection, by determining the first filter processing strength preferentially. On the other hand, it is also possible to set the second filter processing strength preferentially and adjust the first filter processing strength according to the set second filter processing strength. In this case, the sharpening processing that is stable processing with less adverse effects is preferentially performed. The case of performing the sharpening processing preferentially is suitable for a case of performing imaging using an optical system (lens 16 or the like) having a good accuracy in optical characteristics, a case where the imaging scene is a night scene or a portrait, a case where art filter processing is performed, a case where it is difficult to obtain the effect of the point image restoration processing, a case where the adverse effects of the point image restoration processing are likely to occur.

Specific embodiments regarding the adjustment of the first filter processing (sharpening processing) and the second filter processing (sharpening processing) will be described below.

First Embodiment

Figure 5:
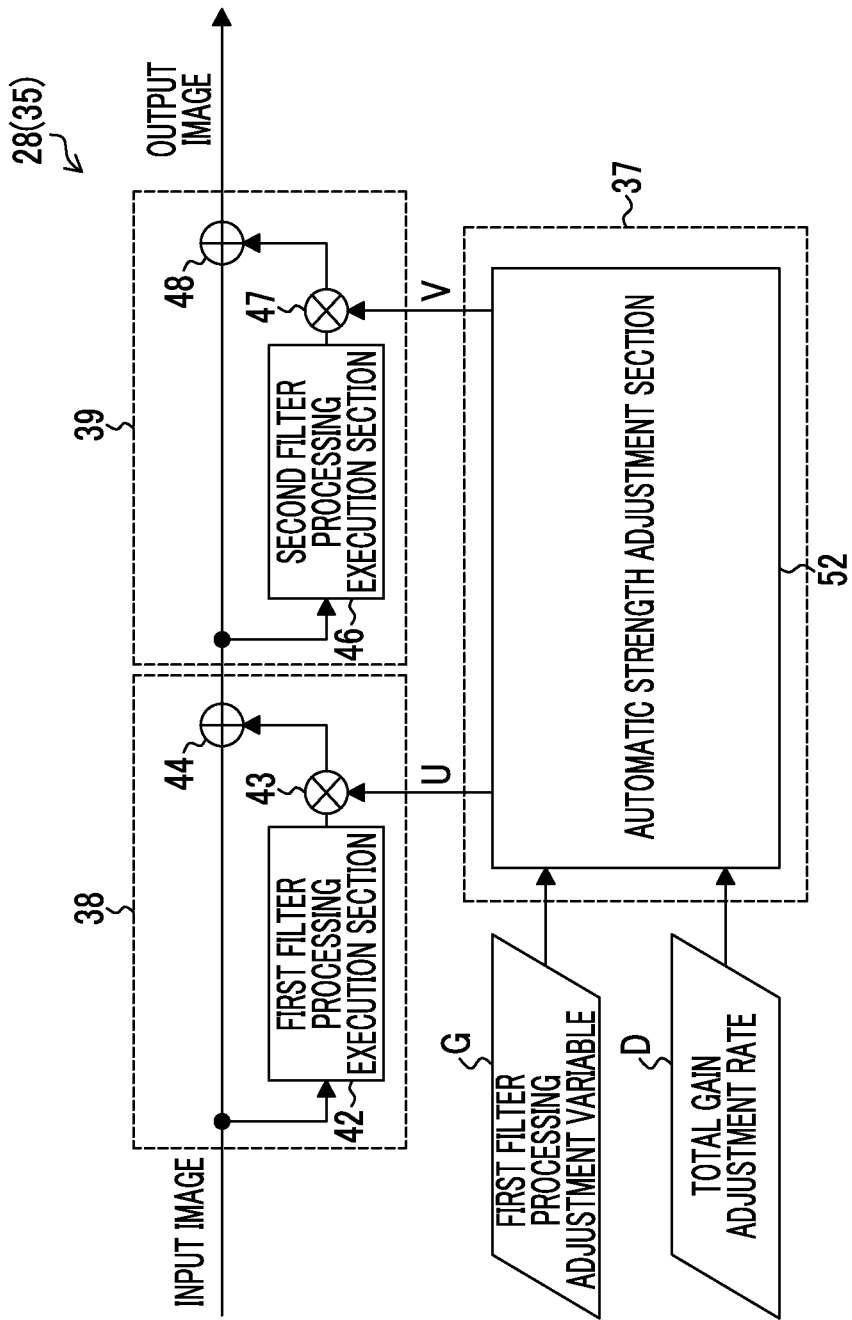
FIG. 5 is a diagram showing the configuration of an image processing block according to a first embodiment.

FIG. 5 is a diagram showing the configuration of an image processing block according to a first embodiment.

In the image processing system model (image processing unit 35) of the present embodiment, a "first filter processing block" and a "second filter processing block" are connected in series (cascaded), so that continuous signal strength adjustment can be performed by both the processing blocks. That is, the first filter processing section 38 and the second filter processing section 39 are provided in series, and the input image signal is subjected to one (in the example shown in FIG. 5, "first filter processing") of the first filter processing and the second filter processing and is then subjected to the other processing (in the example shown in FIG. 5, "second filter processing").

The first filter processing in this example includes processing for applying a sharpening filter (first filter) to the image signal and processing for adjusting the magnification of the gain of a signal, which is obtained by the application of the sharpening filter, based on the adjustment magnification. That is, the first filter processing section 38 includes a first filter processing execution section 42, a first filter processing multiplier 43, and a first filter processing adder 44. The first filter processing execution section 42 applies a sharpening filter to the input image data to calculate increment or decrement data of the image. The first filter processing multiplier 43 performs a multiplication of the increment or decrement data and a first gain adjustment magnification U by performing gain control of the increment or decrement data calculated by the first filter processing execution section 42. The first filter processing adder 44 adds the image signal (input image data) before being input to the first filter processing execution section 42 and the increment or decrement data after the multiplication of the first gain adjustment magnification U. The first filter processing is configured to include a series of processes in the first filter processing execution section 42, the first filter processing multiplier 43, and the first filter processing adder 44.

In addition, the first filter processing section 38 can reflect the first gain adjustment magnification U in the image data using any method. In the present embodiment and other embodiments, instead of the method described above, other methods equivalent to the above method may be used. For example, image data (input image data+increment or decrement data) obtained by applying an sharpening filter to the input image data may be multiplied by the first gain adjustment magnification U while multiplying the input image data by the magnification (1−U), and both the results may be added together.

On the other hand, the second filter processing in this example includes processing for applying a sharpening filter (second filter) to the image signal and processing for adjusting the magnification of the gain of a signal, which is obtained by the application of the sharpening filter, based on the adjustment magnification. That is, the second filter processing section 39 includes the second filter processing execution section 46, a second filter processing multiplier 47, and a second filter processing adder 48. In this example, image data after the first filter processing is input to the second filter processing execution section 46 as input image data. The second filter processing execution section 46 applies a sharpening filter to the input image data to calculate increment or decrement data of the image. The second filter processing multiplier 47 performs a multiplication of the increment or decrement data and a second gain adjustment magnification V by performing gain control of the increment or decrement data calculated by the second filter processing execution section 46. The second filter processing adder 48 generates output image data by adding the image data before being input to the second filter processing execution section 46 (image signal after the first filter processing) and the increment or decrement data after the multiplication of the second gain adjustment magnification V. The second filter processing is configured to include a series of processes in the second filter processing execution section 46, the second filter processing multiplier 47, and the second filter processing adder 48.

Similar to the method of reflecting the first gain adjustment magnification U, the second filter processing section 39 can reflect the second gain adjustment magnification V in the image data using any method. In the present embodiment and other embodiments, instead of the method described above, other methods equivalent to the above method may be used. For example, image data (input image data+increment or decrement data) obtained by applying a sharpening filter (outline enhancement filter) to the input image data may be multiplied by the second gain adjustment magnification V while multiplying the input image data by the magnification (1−V), and both the results may be added together.

Although the sharpening filter used in the first filter processing execution section 42 and the second filter processing execution section 46 is determined using any method, a single sharpening filter is held and used in each of the first filter processing execution section 42 and the second filter processing execution section 46 in this example.

The filter processing control section 37 determines the adjustment magnification in the first filter processing (first filter processing multiplier 43) based on the external input parameter, and calculates the adjustment magnification in the second filter processing (second filter processing multiplier 47) based on the adjustment magnification in the first filter processing and the total gain adjustment rate. That is, the filter processing control section 37 in this example includes an automatic strength adjustment section 52, and a first filter processing adjustment variable (detail sharpness adjustment variable) G and a total gain adjustment rate (total sharpness target value) D are input to the automatic strength adjustment section 52.

The first filter processing adjustment variable G is data that forms the basis of the first gain adjustment magnification U used in the first filter processing section 38 (first filter processing multiplier 43). The total gain adjustment rate D is data determined based on the first gain adjustment magnification U and the second gain adjustment magnification V, and is the criteria for determining the first gain adjustment magnification U and the second gain adjustment magnification V to be described later. Each of the first filter processing adjustment variable G and the total gain adjustment rate D may be designated through the user interface 29 by the user, or may be determined based on the optical characteristics information by the filter processing control section 37 or the like. Accordingly, the first filter processing adjustment variable G and the total gain adjustment rate D having different values according to the optical characteristics information may be selected by the filter processing control section 37 (body controller 28) or the like. In addition, the first filter processing adjustment variable G and the total gain adjustment rate D may be determined in advance, and the user may appropriately adjust the first filter processing adjustment variable G and the total gain adjustment rate D through the user interface 29.

The "optical characteristics information" referred to herein may include the type information of the lens 16 provided in the optical system, individual differences information of the optical system, and other imaging setting conditions. The optical characteristics information is stored in an arbitrary storage unit. For example, the optical characteristics information may be stored in a storage unit (lens unit storage unit 21) of the lens unit 12, or the optical characteristics information may be stored in a storage unit (main body storage unit 31) of the camera body 14. Accordingly, in the filter processing control section 37 (body controller 28) or the like, the first filter processing adjustment variable G and the total gain adjustment rate D may be determined based on the optical characteristics information stored in a storage unit (an optical system storage unit, a main body storage unit).

In addition, the optical characteristics information (imaging setting conditions and the like) is input to the filter processing control section 37 (automatic strength adjustment section 52), the first filter processing section 38 (first filter processing execution section 42), and the second filter processing section 39 (second filter processing execution section 46) in any method. For example, from a control processing unit (not shown) that manages the optical characteristics information of the device control unit 34 and the image processing unit 35 of the body controller 28, the optical characteristics information may be transmitted to the filter processing control section 37, the first filter processing section 38, and the second filter processing section 39 when necessary.

The automatic strength adjustment section 52 determines the first gain adjustment magnification U based on the first filter processing adjustment variable G, and determines the second gain adjustment magnification V based on the first gain adjustment magnification U (first filter processing adjustment variable G) and the total gain adjustment rate D (here, "first gain adjustment magnification U≥0" and "second gain adjustment magnification V≥0" are satisfied). Specifically, the second gain adjustment magnification V is determined by finding the second gain adjustment magnification V so that the total sharpness evaluation value (total sharpness evaluation function) defined by the first gain adjustment magnification U and the second gain adjustment magnification V becomes equal to the total gain adjustment rate D.

In addition, the automatic strength adjustment section 52 acquires the frequency characteristics of a sharpening filter used in each of the first filter processing execution section 42 and the second filter processing execution section 46. For example, in a case where a sharpening filter used in the first filter processing execution section 42 and the second filter processing execution section 46 is fixed, the automatic strength adjustment section 52 may acquire the frequency characteristics of each sharpening filter by storing the frequency characteristics of each sharpening filter in advance. In addition, each sharpening filter used in the first filter processing execution section 42 and the second filter processing execution section 46 may be transmitted to the automatic strength adjustment section 52, and the automatic strength adjustment section 52 may acquire the frequency characteristics of the sharpening filter by analyzing the received sharpening filter. When determining the first gain adjustment magnification U and the second gain adjustment magnification V based on the total sharpness evaluation value, the automatic strength adjustment section 52 considers the frequency characteristics of the sharpening filters used in the first filter processing execution section 42 and the second filter processing execution section 46. Specifically, the automatic strength adjustment section 52 reflects the frequency characteristics of the sharpening filter in the total sharpness evaluation value, and determines the first gain adjustment magnification U and the second gain adjustment magnification V based on the total sharpness evaluation value reflecting the frequency characteristics of the sharpening filter.

Then, the automatic strength adjustment section 52 transmits the determined first gain adjustment magnification U to the first filter processing multiplier 43, and transmits the second gain adjustment magnification V to the second filter processing multiplier 47. The first gain adjustment magnification U and the second gain adjustment magnification V are strength adjustment parameters in the first filter processing section 38 and the second filter processing section 39. Accordingly, the first filter processing multiplier 43 and the second filter processing multiplier 47 perform multiplication processing using the first gain adjustment magnification U and the second gain adjustment magnification V that are transmitted from the automatic strength adjustment section 52.

For example, the determination of the first gain adjustment magnification U and the second gain adjustment magnification V in the automatic strength adjustment section 52 can be performed according to the following flow.

Prior to the image processing in the first filter processing section 38 and the second filter processing section 39, the automatic strength adjustment section 52 (filter processing control section 37) acquires the first filter processing adjustment variable G and the total gain adjustment rate D first. In this example, the first filter processing adjustment variable G and the total gain adjustment rate D are designated in advance by the user. The method of designating the first filter processing adjustment variable G and the total gain adjustment rate D by the user is not particularly limited. For example, it is possible to easily determine the first filter processing adjustment variable G and the total gain adjustment rate D by displaying adjustment means, such as a slider for designating the first filter processing adjustment variable G and the total gain adjustment rate D, on the user interface 29 (back display unit or the like) so that the user performs an operation through the adjustment means.

The first filter processing adjustment variable G is basic data (control value) for controlling the first gain adjustment magnification U of the first filter processing that is used in the first filter processing multiplier 43. In this example, as will be described later, for example, except for a case in that the value of the first gain adjustment magnification U is greater than a specific threshold value, the first gain adjustment magnification U and the first filter processing adjustment variable G are the same (first gain adjustment magnification U=first filter processing adjustment variable G). The case in which the first filter processing adjustment variable G is 0 (zero) corresponds to a case where the first filter processing is OFF. The first gain adjustment magnification U in the first filter processing may be changed to have consecutive values, or may be changed to have discrete values, or may be changed according to ON or OFF (according to whether or not the "specific magnification" is "0 (zero)"). Alternatively, it is possible to mount a processing circuit or the like that can change the first gain adjustment magnification U using any method.

The total gain adjustment rate D is data to determine the sharpness serving as a basis in the entire image processing system (the first filter processing section 38 and the second filter processing section 39).

On the other hand, assuming that the frequency characteristics of the first filter used in the first filter processing execution section 42 (filter for extracting outline enhancement components in the sharpening processing) are "$\psi(\omega_x, \omega_y)$", the frequency characteristics of the second filter used in the second filter processing execution section 46 are set to "$\phi(\omega_x, \omega_y)$". In this case, the frequency characteristics of the entire image processing system shown in FIG. 5 in which the first filter processing section 38 and the second filter processing section 39 (sharpening processing) are combined are expressed by the following Equation 1.

$$F(\omega_x, \omega_y | U, V) = [1 + U \times \psi(\omega_x, \omega_y)] \times [1 + V \times \phi(\omega_x, \omega_y)] \quad \text{(Equation 1)}$$

"$F(\omega_x, \omega_y | U, V)$" shows a function for $(\omega_x, \omega_y)$ (frequencies in the x and y directions) with the first gain adjustment magnification U and the second gain adjustment magnification V as parameters, and this function is determined depending on the configuration of the image processing system.

The determination of the first gain adjustment magnification U used in the first filter processing multiplier 43 and the second gain adjustment magnification V used in the second filter processing multiplier 47 is performed so as to maintain the total sharpness evaluation value (total sharpness rate) C(U, V), which is defined by the following Equation 2, at a fixed value (total gain adjustment rate D).

$$C(U,V) = \iint w(\omega_x, \omega_y) F(\omega_x, \omega_y | U, V) d\omega_x d\omega_y \quad \text{(Equation 2)}$$

Here, "$w(\omega_x, \omega_y)$" is an arbitrary weighting function, and the total sharpness evaluation value C(U, V) is defined by the weighted calculation of the frequency characteristics of the entire system. It is preferable that the weighting function $w(\omega_x, \omega_y)$ is designed to be a large value in visually significant frequency components. By using the total sharpness evaluation value C(U, V) defined by the above Equation 2, even if the strength of the first filter processing is changed, the degree of frequency enhancement in a target frequency band is not changed. Accordingly, a large difference in sharpness does not occur. On the other hand, in a frequency band where the weighting function $w(\omega_x, \omega_y)$ is relatively small, the difference in image quality due to the adjustment of the user is likely to be noticeable.

Based on the above, the values of the first gain adjustment magnification U and the second gain adjustment magnification V can be determined as follows. That is, the automatic strength adjustment section 52 determines the value of the first gain adjustment magnification U based on the input first filter processing adjustment variable G, and determines the value of the second gain adjustment magnification V so that the total sharpness evaluation value C(U, V) becomes the total gain adjustment rate D. Therefore, the value of the second gain adjustment magnification V decreases as the value of the first gain adjustment magnification U increases, and the value of the second gain adjustment magnification V increases as the value of the first gain adjustment magnification U decreases. However, if the value of the first gain adjustment magnification U is too large, the total sharpness evaluation value C(U, V) may not be maintained constant even if the value of the second gain adjustment magnification V is set to zero "0". That is, there may be a limitation on the range of the first gain adjustment magnification U in which the total sharpness evaluation value C(U, V) can be maintained constant.

If the upper limit of the first gain adjustment magnification U is denoted as "$U_{MAX}$", the maximum value of the first gain adjustment magnification U is limited as shown in the following Equation 3 so that the total sharpness evaluation value C(U, V) satisfies the relationship of "$C(U_{MAX}, 0) = D$".

$$U = \begin{cases} G & (G \leq U_{MAX}) \\ U_{MAX} & \text{otherwise} \end{cases} \quad \text{(Equation 3)}$$

The above Equation 3 shows that the first filter processing adjustment variable G is set to the first gain adjustment magnification U (U=G) in a case where the first filter processing adjustment variable G is equal to or less than the upper limit $U_{MAX}$ of the first gain adjustment magnification U and the upper limit $U_{MAX}$ of the first gain adjustment magnification U is set to the first gain adjustment magnification U (U=$U_{MAX}$) in a case where the first filter processing adjustment variable G exceeds the upper limit $U_{MAX}$ of the first gain adjustment magnification U.

The value of the second gain adjustment magnification V is calculated by finding the second gain adjustment magnification V at which the total sharpness evaluation value satisfies the relationship of "C(U, V)=D". This is equivalent to finding the solution of the primary equation. Accordingly, the automatic strength adjustment section 52 can easily calculate the second gain adjustment magnification V. The degree of difficulty of the calculation of the second gain adjustment magnification V depends on the definition of the frequency characteristics $F(\omega_x, \omega_y | U, V)$ of the entire system. In a case where the frequency characteristics $F(\omega_x, \omega_y | U, V)$ become a non-linear function and it is difficult to find the second gain adjustment magnification V that strictly satisfies the equation described above, formulation, such as adopting the second gain adjustment magnification V that brings the total sharpness evaluation value C(U, V) closest to the total gain adjustment rate D, may be performed.

Through a series of processes described above, it is possible to calculate the first gain adjustment magnification U and the second gain adjustment magnification V for maintaining the total sharpness evaluation value C(U, V) constant (total gain adjustment rate D).

As described above, according to the present embodiment, the first gain adjustment magnification U and the second gain adjustment magnification V are determined based on the total sharpness (total sharpness evaluation value). Therefore, since a variation in the sharpness of an image (output image) due to the first filter processing and the second filter processing is suppressed, it is possible to stabilize the overall resolution or the image quality in the output image.

In particular, by changing the entire shape of the frequency characteristics while maintaining the response of a frequency band with a specific weighting, among the frequency responses of the entire system, constant, it is possible to flexibly adjust the frequency response of the entire system. Therefore, for example, applications such as adjusting the detail sharpness while maintaining the sharpness as a base are also possible. In addition, by determining the total sharpness evaluation value so that the weighting in a main frequency band increases, the sharpening strength is fixed in the main frequency band. Therefore, it is possible to prevent the sharpness difference from becoming excessive.

In addition, by adjusting the first gain adjustment magnification U and the second gain adjustment magnification V, the frequency characteristics in all of the first filter processing and the second filter processing can also be changed continuously without changing a sharpening filter. Accordingly, it is possible to easily realize the desired frequency characteristics by adjusting the first gain adjustment magnification U and the second gain adjustment magnification V. For this reason, in order to realize many frequency characteristics, it is not necessary to prepare and hold many sharpening filters (first and second filters), and it is not necessary to dynamically design sharpening filters (first and second filters).

In addition, for the control of the strength adjustment parameter in two image processes (first filter processing and the second filter processing), control of "two variables" is generally required, and the degree of freedom of the control is set to "2". However, according to the strength adjustment processing according to the present embodiment, in a case where the total gain adjustment rate D stored in advance is automatically supplied to the automatic strength adjustment section 52 without the operation of the user, the degree of freedom of required control is set to "1". That is, it is possible to determine the appropriate sharpening strength (the first gain adjustment magnification U and the second gain adjustment magnification V) based on the total gain adjustment rate D just by determining the first filter processing adjustment variable G. Therefore, it is also possible to provide the user interface 29 that the user is easy to operate intuitively.

In the example described above, the first gain adjustment magnification U is determined by the first filter processing adjustment variable G, and the second gain adjustment magnification V is calculated from the first gain adjustment magnification U and the total gain adjustment rate D. However, basic data of the second gain adjustment magnification V may be input to the automatic strength adjustment section 52. That is, instead of the first filter processing adjustment variable G, a second filter processing adjustment variable may be input to the automatic strength adjustment section 52. In this case, the automatic strength adjustment section 52 can determine the second gain adjustment magnification V based on the input second filter processing adjustment variable, and can calculate the first gain adjustment magnification U from the second gain adjustment magnification V and the total gain adjustment rate D.

Second Embodiment

The filter processing control section 37 according to the present embodiment calculates the first gain adjustment magnification U and the second gain adjustment magnification V by adjusting the ratio of image signals before and after the signal processing section 40 (the first filter processing section 38 and the second filter processing section 39) to a specific response target ratio at a specific frequency (first frequency).

In the present embodiment, the same reference numerals are given to the same components as in the first embodiment shown in FIG. 5, and the detailed explanation thereof will be omitted.

Figure 6:
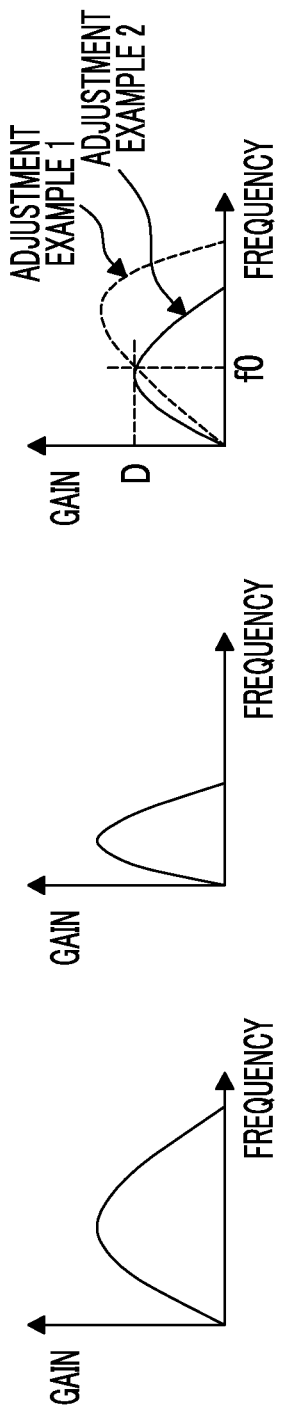
FIGS. 6A to 6C are diagrams illustrating the frequency characteristics of image processing, where

FIGS. 6A to 6C are diagrams illustrating the frequency characteristics of image processing, where FIG. 6A shows an example of the "frequency-gain" relationship in the first filter processing (first filter processing execution section 42), FIG. 6B shows an example of the "frequency-gain" relationship in the second filter processing (second filter processing execution section 46), and FIG. 6C shows an example of the "frequency-gain" relationship in all of the first filter processing and the second filter processing (signal processing section 40).

In the image processing of the present embodiment, a part of the image processing according to the first embodiment described above is simplified. In addition, focusing on a specific frequency, the "first gain adjustment magnification U and the second gain adjustment magnification V" are pinpoint-adjusted for the target frequency.

The target frequency referred to herein is not particularly limited. For example, a frequency that is significant in terms of visual characteristics can be set as the target frequency. In addition, the number of target frequencies is not limited, and a single target frequency or a plurality of target frequencies may be present.

Specifically, this image processing can be realized by defining the weighting function $w(\omega_x, \omega_y)$ of the equation (refer to the above "Equation 2") of the total sharpness evaluation value $C(U, V)$ as follows.

$$w(\omega_x,\omega_y)=\delta(\omega_x,\omega_0)\times\delta(\omega_y) \qquad \text{(Equation 4)}$$

In the above Equation 4, "$\delta(x)$" indicates a Kronecker's delta function, and "$\omega_0$" indicates a frequency in the x direction at a specific frequency f0. In Equation 4 described above, for the frequency, only the frequency in the x direction is referred to. This is because the frequency characteristics of the sharpening filter is assumed to be isotropic and accordingly it is sufficient to refer to the frequency in a specific direction ("x direction" in the above Equation 4).

By using the weighting function expressed by the above Equation 4, as shown in FIG. 6C, a specific gain (total gain adjustment rate D) is always obtained at the specific frequency f0 in the frequency characteristics of the entire image processing system even if the first filter processing adjustment variable G is any value.

The frequency characteristics of the entire first filter processing (first filter processing section 38) are determined by the filter processing of the first filter processing execution section 42 and the gain control processing of the first filter processing multiplier 43, and the magnification of the frequency characteristics (refer to FIG. 6A) of the first filter processing execution section 42 is determined by being adjusted by the first gain adjustment magnification U. Similarly, the frequency characteristics of the entire second filter processing (second filter processing section 39) are determined by the filter processing of the second filter processing execution section 46 and the gain control processing of the second filter processing multiplier 47, and the magnification of the frequency characteristics (refer to FIG. 6B) of the second filter processing execution section 46 is determined by being adjusted by the second gain adjustment magnification V. Therefore, the frequency characteristics (refer to FIG. 6C) of the entire image processing system can be adjusted by controlling the first gain adjustment magnification U and the second gain adjustment magnification V that are applied to the frequency characteristics (refer to FIGS. 6A and 6B) of the first filter processing execution section 42 and the second filter processing execution section 46.

In the adjustment of the first gain adjustment magnification U and the second gain adjustment magnification V in the automatic strength adjustment section 52, there is a limitation that the total gain adjustment rate D is realized at the specific frequency f0, but the number of specific adjustment examples is not determined to be one. For example, in a case where it is necessary to emphasize high frequency components of the image, the first gain adjustment magnification U and the second gain adjustment magnification V are determined so as to obtain a gain that emphasizes the high frequency components as shown in the "adjustment example 1" of FIG. 6C. On the other hand, in a case where it is necessary to emphasize low to medium frequency components without emphasizing the high frequency components of the image, the first gain adjustment magnification U and the second gain adjustment magnification V at which a gain is applied mainly to the low to medium frequency components are determined as shown in the "adjustment example 2" of FIG. 6C.

Other configurations are the same as those in the first embodiment shown in FIG. 5.

As described above, according to the present embodiment, it is possible to stabilize the image quality by suppressing the variation in the sharpness of the output image subjected to the first filter processing and the second filter processing.

In particular, since the gain at the specific frequency f0 is fixed, it is possible to use a method of "adjusting the sharpness of high frequencies while maintaining the sharpness of low frequencies as a base constant", for example. Therefore, it is possible to flexibly control the frequency characteristics of the entire image processing. For example, by displaying operation means, such as a slider, on the user interface 29 so that the user can adjust the first filter processing adjustment variable G through the operation means, it is also possible to adjust the sharpness of high frequencies while maintaining the sharpness of low frequencies as a base, among the image signals, constant.

Third Embodiment

Figure 7:
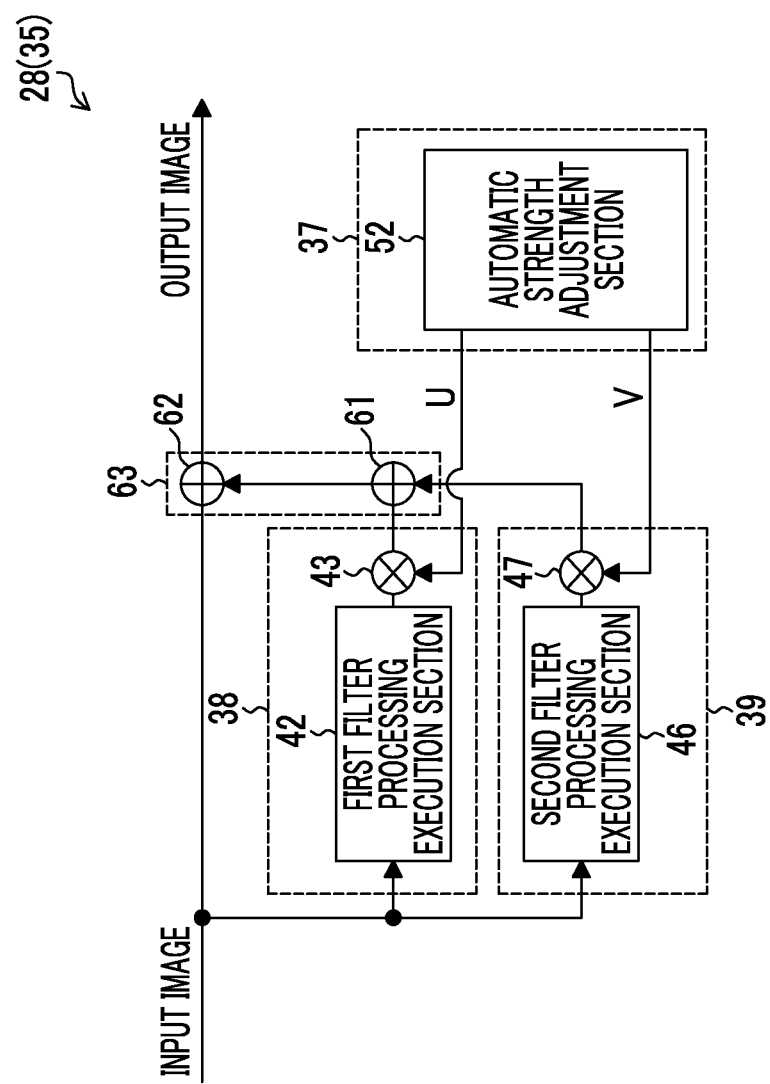
FIG. 7 is a diagram showing the configuration of an image processing block according to a third embodiment.

FIG. 7 is a diagram showing the configuration of an image processing block according to a third embodiment.

In the present embodiment, the same reference numerals are given to the same components as in the first embodiment shown in FIG. 5, and the detailed explanation thereof will be omitted.

The first filter processing section 38 and the second filter processing section 39 according to the present embodiment are provided in parallel. An image signal is input to the first filter processing section 38 and the second filter processing section 39, and increment or decrement data of the image signal due to the first filter processing and increment or decrement data of the image signal due to the second filter processing are added together.

The image processing unit 35 of the present embodiment includes a sharpening adjustment section 63. The sharpening adjustment section 63 includes a first adder 61 that adds the increment or decrement data of the image data from the first filter processing section 38 and the increment or decrement data of the image data from the second filter processing section 39 and a second adder 62 that adds the increment or decrement data after the addition, which is output from the first adder 61, and the input image data.

In the present embodiment configured as described above, the "first filter processing of the first filter processing execution section 42 and the first filter processing multiplier 43" and the "second filter processing of the second filter processing execution section 46 and the second filter processing multiplier 47" on the image signal are performed in parallel, and increment or decrement data corresponding to the difference value from the image signal (input image data) is calculated in each process. The increment or decrement data of the image signal due to the first filter processing and the increment or decrement data of the image signal due to the second filter processing are added together by the first adder 61. As a result, increment or decrement data of the image data due to all of the first filter processing and the second filter processing is calculated. The "increment or decrement data of the image data due to the entire processing" and the image signal (input image) are added together by the second adder 62. As a result, an image signal (output image) subjected to the first filter processing and the second filter processing is generated.

Other configurations are the same as those in the first embodiment shown in FIG. 5. For example, the first gain adjustment magnification U and the second gain adjustment magnification V that are used in the first filter processing multiplier 43 and the second filter processing multiplier 47 are appropriately determined by the automatic strength adjustment section 52.

The frequency characteristics of the entire image processing system in this example are expressed by the following Equation 5.

$$F(\omega_x,\omega_y,U,V)=1+U\times\psi(\omega_x,\omega_y)+V\times\phi(\omega_x,\omega_y) \quad \text{(Equation 5)}$$

In the above Equation 5, the frequency characteristics of the first filter processing section 38 are expressed by "$U\times\psi(\omega_x, \omega_y)$", and the frequency characteristics of the second filter processing section 39 are expressed by "$V\times\phi(\omega_x, \omega_y)$". Accordingly, the addition processing of the first adder 61 is based on the frequency characteristics of "$U\times\psi(\omega_x, \omega_y)+V\times\phi(\omega_x, \omega_y)$", and the addition processing of the second adder 62 is based on the frequency characteristics of "$1+U\times\psi(\omega_x, \omega_y)+V\times\phi(\omega_x, \omega_y)$".

As described above, also in the present embodiment, it is possible to stabilize the image quality by suppressing the variation in the sharpness of the output image subjected to the first filter processing and the second filter processing, as in the case in which the first filter processing section 38 and the second filter processing section 39 are disposed in series. Even if the first filter processing section 38 and the second filter processing section 39 are arranged in parallel, it is possible to perform control, such as adjusting the sharpness of high frequencies while maintaining the sharpness of low frequencies as a base, among the image signals, constant.

Fourth Embodiment

The image processing unit 35 according to the present embodiment further includes a non-linear processing section that performs non-linear processing of the image signal, and non-linear processing is introduced in a two-stage filter processing system (the first filter processing section 38 and the second filter processing section 39). Although the non-linear processing section is included in at least any one of the first filter processing section 38 or the second filter processing section 39, an example in which a non-linear processing section 65 is provided in the first filter processing section 38 will be described below.

In general, the non-linear processing may include not only arithmetic processing of addition, subtraction, multiplication, and division but also processing including the reference of a look-up table (LUT) or conditional branching, for example. The non-linear processing is often performed in order to suppress artifacts or noise. For example, "clipping processing for adjusting the image signal value (pixel value) exceeding the clip threshold value among image signals to the clip threshold value" may be performed as the non-linear processing.

Figure 9A:
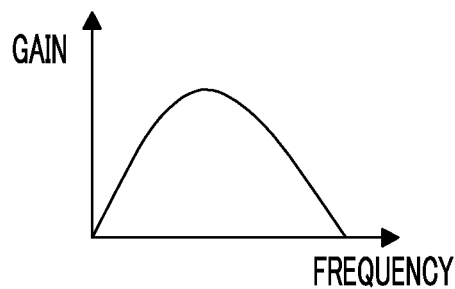
FIGS. 9A and 9B are diagrams illustrating the frequency characteristics of image processing, where
Figure 9B:
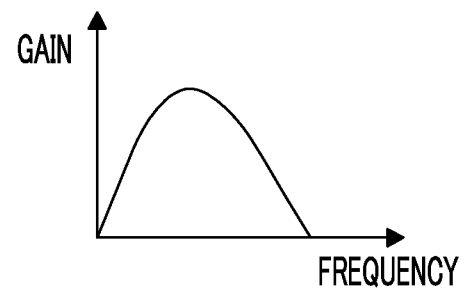

FIG. 8 is a diagram showing the configuration of an image processing block according to a fourth embodiment. FIGS. 9A and 9B are diagrams illustrating the frequency characteristics of image processing, where FIG. 9A shows an example of the "frequency-gain" relationship in the first filter processing (first filter processing execution section 42) and FIG. 9B shows an example of the "frequency-gain" relationship in the second filter processing (second filter processing execution section 46).

In the present embodiment, the same reference numerals are given to the same components as in the first embodiment shown in FIG. 5, and the detailed explanation thereof will be omitted.

The first filter processing (first filter processing section 38) in this example includes a series of processing, such as application of the enhancement magnification to the enhancement component of the image signal extracted by the sharpening filter, application of non-linear processing to the image enhancement component after the application of the enhancement magnification, and combination of the image enhancement component after the non-linear processing and the original image.

That is, an image signal (input image data) is input to the first filter processing execution section 42, and is subjected to filtering processing by the first filter. As a result, increment or decrement data of the image signal due to the first filter processing is calculated. The increment or decrement data is input to the first filter processing multiplier 43, and the multiplication of the increment or decrement data and the first gain adjustment magnification U is performed by the first filter processing multiplier 43. Increment or decrement data after the multiplication is input to the non-linear processing section 65.

In the non-linear processing section 65, clipping processing (non-linear processing) on the input increment or decrement data is performed, so that data exceeding a specific clip threshold value among the pieces of input increment or decrement data (image data) is adjusted to the clip threshold value. The clip threshold value may be determined in advance and be stored in the non-linear processing section 65, or the user may designate the clip threshold value directly or indirectly through the user interface 29. The increment or decrement data of the image signal after the clipping processing is added to the image signal (input image data) by the first filter processing adder 44 before being input to the first filter processing execution section 42. As a result, an image signal (image data) after the first filter processing is calculated.

The clipping processing performed by the non-linear processing section 65 is processing for limiting the image signal so as not to take a value equal to or greater than a clip threshold value θ (≥0), as shown in the following Equation 6.

$$\text{CLIP}(x) = \begin{cases} x & (|x| < \theta) \\ \text{sign}(x) \times \theta & (|x| \geq \theta) \end{cases} \quad \text{(Equation 6)}$$

According to a clipping processing function CLIP(x) expressed by the above Equation 6, in a case where the absolute value of a signal component (x) of the image signal is smaller than the clip threshold value θ (|x|<θ), the signal component is maintained without being adjusted by the clipping processing, and "x" is output from the non-linear processing section 65. On the other hand, in a case where the absolute value of the signal component (x) of the image signal is equal to or greater than the clip threshold value θ (|x|≥θ), the signal component is adjusted by the signum function, and "sign(x)×θ" is output from the non-linear processing section 65.

In consideration of the clipping processing (non-linear processing), the filter processing control section 37 (automatic strength adjustment section 52) in this example may determine the adjustment magnification (the first gain adjustment magnification U, the second gain adjustment magnification V) in at least any one of the first filter processing or the second filter processing according to the clip threshold value θ.

Other configurations are the same as those in the first embodiment shown in FIG. 5. For example, the filter processing of the second filter processing execution section 46 in the second filter processing section 39, the multiplication processing of the second filter processing multiplier 47, and the addition processing of the second filter processing adder 48 are performed in the same manner as in the first embodiment described above.

Although the non-linear processing section 65 is provided in the first filter processing section 38 in this example, the non-linear processing section may be provided only in the second filter processing section 39, or may be provided in both of the first filter processing section 38 and the second filter processing section 39. However, if the non-linear processing is performed in both of the first filter processing section 38 and the second filter processing section 39, the frequency response approximation of the entire image processing system becomes complicated. Accordingly, there is a possibility that control to determine the first gain adjustment magnification U and the second gain adjustment magnification V while maintaining the total sharpness evaluation value C(U, V) at a fixed value will become difficult.

In a case where a high contrast waveform (image signal) is input to the image processing system (image processing unit 35) having the configuration shown in FIG. 8, the enhancement component of the high contrast waveform signal has a relatively large amplitude due to the processing of the first filter processing execution section 42 and the first filter processing multiplier 43. However, since the clipping processing is performed in the non-linear processing section 65, the enhancement component of the high contrast waveform signal is restricted. Accordingly, the signal enhancement effect of the first filter processing execution section 42 and the first filter processing multiplier 43 that are provided in the preceding stage is weakened. On the other hand, since the non-linear processing is not performed in the second filter processing section 39, the high contrast waveform signal is emphasized by the second filter processing execution section 46 and the second filter processing multiplier 47. Accordingly, for the high contrast waveform signal, the influence of the second filter processing section 39 is larger than that of the first filter processing section 38. For this reason, the frequency enhancement effect of the second filter processing section 39 becomes dominant.

On the other hand, in a case where a low contrast waveform (image signal) is input to the image processing system shown in FIG. 8, a signal is emphasized by the processing of the first filter processing execution section 42 and the first filter processing multiplier 43. However, the amplitude of the enhancement component is relatively small due to the low contrast. Accordingly, the low contrast waveform signal subjected to the processing of the first filter processing execution section 42 and the first filter processing multiplier 43 is hardly restricted by the clipping processing in the non-linear processing section 65. For this reason, the low contrast waveform signal subjected to the processing of the first filter processing execution section 42 and the first filter processing multiplier 43 easily passes through the non-linear processing section 65 without being substantially clipped. Therefore, for the low contrast waveform signal, the first filter processing section 38 and the second filter processing section 39 cooperate with each other so that the signal processing effect (sharpening effect) of both the first filter processing section 38 and the second filter processing section 39 acts synergistically.

In addition, although the non-linear processing section 65 is provided only in the first filter processing section 38 in the example shown in FIG. 8, the same is true for a case where the non-linear processing section (clipping processing section) 65 is provided only in the second filter processing section 39. In this case, for the high contrast waveform signal, the influence of the first filter processing section 38 is likely to be larger than that of the second filter processing section 39. In addition, for the low contrast waveform signal, the first filter processing section 38 and the second filter processing section 39 act synergistically.

Thus, in the case in which the non-linear processing section 65 is provided in only one of the first filter processing section 38 and the second filter processing section 39, the high contrast frequency characteristics and the low contrast frequency characteristics can be made to be different. Therefore, for example, in a case where the user designates an adjustment variable (for example, the first filter processing adjustment variable G) to find the gain adjustment magnification (for example, the first gain adjustment magnification U), the desire of the user can be effectively reflected by the image signal by providing the non-linear processing section 65 in a processing section (for example, the second filter processing section 39) for which the user does not designate an adjustment variable without providing the non-linear processing section 65 in a processing portion (for example, the first filter processing section 38) for which the user designates an adjustment variable.

In a case where an image processing unit that performs non-linear processing is present in a signal processing system, it is theoretically impossible to calculate the frequency characteristics of the signal processing system accurately, and automatic calculation processing of the first gain adjustment magnification U and the second gain adjustment magnification V may not be able to be applied. Accordingly, in the case in which non-linear processing is performed, processing for automatically calculating the first gain adjustment magnification U and the second gain adjustment magnification V may be performed by approximately evaluating the internal frequency characteristics from the output waveform for a specific input waveform and by using the frequency characteristics obtained by the approximate evaluation. In this case, since it is necessary to calculate the frequency characteristics $F(\omega_x, \omega_y | U, V)$ of the entire system, it is necessary to express the frequency response approximation of the system for a specific input waveform using an expression. The accuracy of the frequency response approximation of the system depends on the specific content of the non-linear processing.

For example, in the image processing system including the clipping processing shown in FIG. 8, in a case where an input waveform (image signal) whose characteristics are grasped in advance is used and the weighting function $w(\omega_x, \omega_y)$ is defined so as to have a specific value (total gain adjustment rate D) at the specific frequency f0 as in the second embodiment described above (refer to the above "Equation 4"), the present inventors have empirically learned that the frequency characteristics of the entire image processing system can be approximately expressed by the following Equation 7.

$$F(\omega_x, \omega_y | U, V) = [1 + \min(U \times \psi(\omega_x, \omega_y), A)] \times [1 + V \times \phi(\omega_x, \omega_y)] \quad \text{(Equation 7)}$$

In the above Equation 7, "A" is a constant depending on the clip threshold value θ and the sharpness (degree of blurring) of the input image signal. In addition, "$\min(U \times \psi(\omega_x, \omega_y), A)$" is a function showing the smaller one of "$U \times \psi(\omega_x, \omega_y)$" and "A".

If "pinpoint adjustment for the target frequency f0 of the "first gain adjustment magnification U and the second gain adjustment magnification V"" according to the second embodiment described above is performed using the above Equation 7, the frequency characteristics (high contrast frequency characteristics) for the high contrast input waveform (image signal) are not changed greatly even if the first filter processing adjustment variable G is any value. Accordingly, the sharpness as a base is hardly changed. On the other hand, the frequency characteristics (low contrast frequency characteristics) for the low contrast image signal are amplified if the first filter processing adjustment variable G is increased.

Figure 10A:
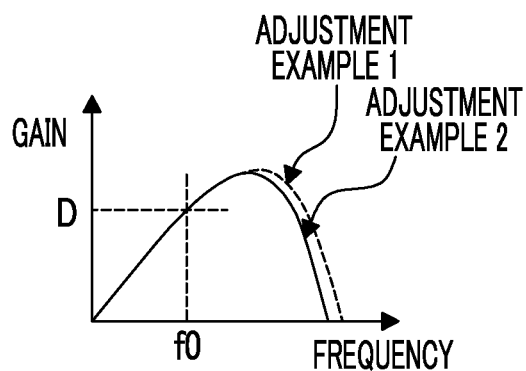
FIGS. 10A and 10B are diagrams illustrating the frequency characteristics of image processing, where
Figure 10B:
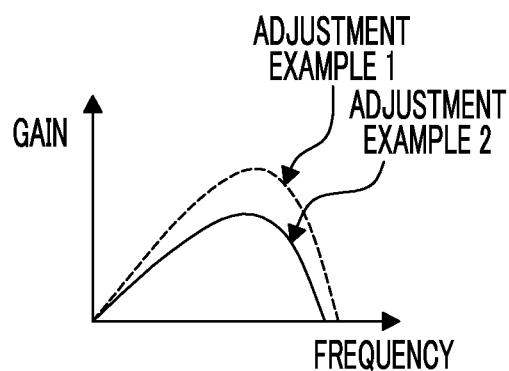

FIGS. 10A and 10B are diagrams illustrating the frequency characteristics of image processing, where FIG. 10A is a diagram showing an example of adjustment for the high contrast waveform signal and FIG. 10B is a diagram showing an example of adjustment for the low contrast waveform signal. When the adjustment examples 1 and 2 shown in FIGS. 10A and 10B are compared, the frequency characteristics ("frequency-gain" characteristics) are hardly changed between the adjustment examples 1 and 2 in the high contrast waveform signal shown in FIG. 10A, but the frequency characteristics are changed relatively greatly between the adjustment examples 1 and 2 in the low contrast waveform signal shown in FIG. 10B.

Thus, according to this example, it is possible to control the detail enhancement degree based on the low contrast component without changing the high contrast component of the image signal too much by adjusting the first filter processing adjustment variable G.

As described above, according to the present embodiment, even in a case where the non-linear processing is performed in the first filter processing section 38 and/or the second filter processing section 39, it is possible to accurately calculate the first gain adjustment magnification U and the second gain adjustment magnification V. That is, even if the non-linear processing is performed in the later stage than a filter application section (the first filter processing execution section 42, the second filter processing execution section 46), it is possible to adjust the first gain adjustment magnification U and the second gain adjustment magnification V so that the frequency characteristics for the specific input waveform of the image signal are approximately constant. Accordingly, it is possible to obtain a desired gain (total gain adjustment rate D) at the specific frequency f0.

In addition, since the user can adjust the first filter processing adjustment variable G through operation means, such as a slider displayed on the user interface 29, it is possible to adjust only the sharpness of the low contrast independently while easily maintaining the sharpness of the high contrast as a base constant.

In the above example, a case (refer to FIG. 9) has been described in which the frequency characteristics of the first filter processing (the first filter processing execution section 42 and the first filter processing multiplier 43) are different from the frequency characteristics of the second filter processing (the second filter processing execution section 46 and the second filter processing multiplier 47). In the present embodiment, however, the frequency characteristics of the first filter processing and the frequency characteristics of the second filter processing may be the same. That is, in a case where the non-linear processing block is included in the first filter processing section 38 and/or the second filter processing section 39, it is possible to perform desired frequency component adjustment based on the processing configuration shown in FIG. 8 even if the frequency characteristics of the first filter processing and the frequency characteristics of the second filter processing are the same.

Other Modification Examples

The embodiments described above are just illustrative, and it is also possible to apply the present invention to other configurations.

FIG. 11 is a diagram showing the configuration of an image processing block according to a modification example.

In the above embodiments, examples are shown in which the first filter processing section 38 and the second filter processing section 39 perform the same type of image processing (sharpening processing). However, the first filter processing section 38 and the second filter processing section 39 may also be made to perform different types of image processing. For example, point image restoration processing may be performed in the first filter processing section 38, and sharpening processing may be performed in the second filter processing section 39. In this case, in the first filter processing execution section 42, restoration processing using a restoration filter based on the point spread function of the optical imaging system is performed as the first filter processing, and the restoration filter to be used is determined based on the imaging setting conditions in the imaging and acquisition of the image signal. The method of acquiring the restoration filter and the imaging setting conditions are not particularly limited. For example, as shown in FIG. 11, imaging setting conditions S may be input to a restoration filter selection section 53, and the restoration filter selection section 53 may select a restoration filter X corresponding to the imaging setting conditions S from a restoration filter storage unit 58 that stores a plurality of restoration filters, and the selected restoration filter X may be transmitted to the first filter processing execution section 42 and the automatic strength adjustment section 52.

In addition, the restoration processing using the restoration filter based on the point spread function is not particularly limited, and may be not only the processing for reducing the degradation of image quality due to the point spread phenomenon of the optical system but also processing for reducing the degradation of image quality due to shake (camera shake, subject shake, or the like) at the time of imaging, for example. Accordingly, the point spread function as the basis of the restoration filter is not limited to a function showing the response to the point light source of the optical system, and may be a function reflecting the amount of movement of the subject (for example, the amount of movement of the subject due to camera shake, subject shake, or the like) that is detected at the time of imaging of the imaging apparatus. Therefore, in a case where point image restoration processing is performed in the first filter processing section 38 and/or the second filter processing section 39, it is possible to perform blur recovery processing for acquiring a sharp image from an image that has been blurred due to the point spread phenomenon of the optical system or electronic image stabilization processing for acquiring a sharp image from the blurred image.

The adjustment magnification (the first gain adjustment magnification U, the second gain adjustment magnification V) in at least any one of the first filter processing or the second filter processing may be determined based on the imaging setting conditions in the imaging and acquisition of the image signal. For example, as shown in FIG. 11, a first filter strength list storage unit 67 that stores a plurality of first filter processing adjustment variables G may be provided in the lens unit storage unit 21 of the lens unit 12, and an adjustment variable selection section 69 to which the imaging setting conditions S are input may select the first filter processing adjustment variable G corresponding to the imaging setting conditions S from the first filter strength list storage unit 67 and supply the selected first filter processing adjustment variable G to the automatic strength adjustment section 52. In addition, a second filter strength list storage unit 60 that stores a plurality of second gain adjustment magnifications V0 may be provided in the lens unit storage unit 21 of the lens unit 12, and a second filter strength selection section 54 to which the imaging setting conditions S are input may select the second gain adjustment magnification V0 corresponding to the imaging setting conditions S from the second filter strength list storage unit 60 and may supply the selected second gain adjustment magnification V0 to the automatic strength adjustment section 52. In this case, by storing the "second gain adjustment magnification V0 in a case where processing in the first filter processing section 38 is substantially OFF" in the second filter strength list storage unit 60, it is also possible to use the second gain adjustment magnification V0, which is transmitted to the automatic strength adjustment section 52 from the second filter strength selection section 54, as the total gain adjustment rate D.

In addition, in each of the embodiments described above, an example has been described in which the first gain adjustment magnification U and the second gain adjustment magnification V are automatically adjusted and calculated in the digital camera 10. However, the automatic adjustment and calculation may be performed in advance by the manufacturer before shipment, and all parameters of the calculated first gain adjustment magnification U and second gain adjustment magnification V may be stored in the digital camera 10 (the lens unit storage unit 21, the main body storage unit 31, or the like). For example, the digital camera 10 can store a table in which the "first gain adjustment magnification U and the second gain adjustment magnification V" are matched with the "imaging setting conditions S", and the automatic strength adjustment section 52 can calculate the first gain adjustment magnification U and the second gain adjustment magnification V from the imaging setting conditions S by referring to the table. In this case, a parameter generating method for generating the parameters used in the digital camera 10 (image processing unit) includes a "step of acquiring the total gain adjustment rate based on the adjustment magnification of the gain of the signal in the first filter processing and the adjustment magnification of the gain of the signal in the second filter processing" and a "step of acquiring the adjustment magnification in one of the first filter processing and the second filter processing and calculating the adjustment magnification in the other one of the first filter processing and the second filter processing". These steps can be executed in the same manner as in the automatic strength adjustment section 52 according to the first embodiment described above, for example.

The embodiments described in this specification may be appropriately combined with each other, and arbitrary ones of the first to fourth embodiments and the modification examples may be combined with each other.

In addition, each functional configuration described above can be appropriately realized by any hardware, software, or combination of both hardware and software. For example, the present invention can also be applied to a program causing a computer to execute an image processing method (image processing procedure) in each of the above-described devices and processing units (the body controller 28, the device control unit 34, the image processing unit 35 (the filter processing control section 37, the first filter processing section 38, and the second filter processing section 39), and the like), a computer-readable recording medium (non-transitory recording medium) in which the program is recorded, or a computer in which the program can be installed.

In addition, applicable forms of the present invention are not limited to the digital camera and the computer (server), and the present invention can be applied not only to cameras having an imaging function as a main function but also to mobile devices having an imaging function and other functions (a call function, a communication function, other computer functions) other than the imaging function. As other forms to which the present invention can be applied, for example, a mobile phone or a smartphone having a camera function, a personal digital assistant (PDA), and a portable game machine can be mentioned. Hereinafter, an example of the smartphone to which the present invention can be applied will be described.

<The Configuration of a Smartphone>

Figure 12:
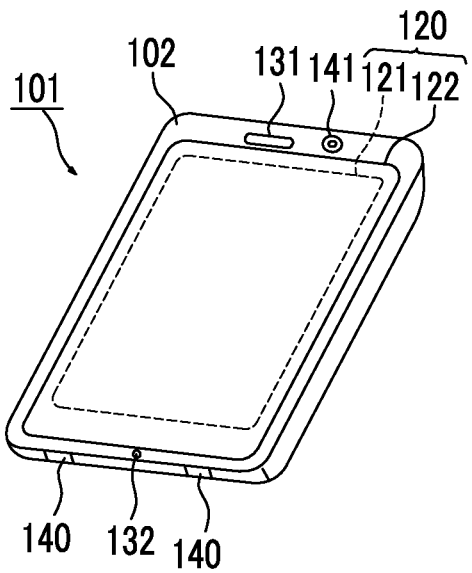
FIG. 12 is a diagram showing the appearance of a smartphone that is an embodiment of an imaging apparatus.

FIG. 12 is a diagram showing the appearance of a smartphone 101 that is an embodiment of the imaging apparatus of the present invention. The smartphone 101 shown in FIG. 12 includes a plate-shaped housing 102. On one surface of the housing 102, a display input unit 120 is provided in which a display panel 121 as a display unit and an operation panel 122 as an input unit are integrated. The housing 102 includes a speaker 131, a microphone 132, an operation unit 140, and a camera unit 141. The configuration of the housing 102 is not limited to this. For example, it is possible to adopt a configuration in which a display unit and an input unit are separated from each other, or it is possible to adopt a configuration having a folded structure or a sliding mechanism.

Figure 13:
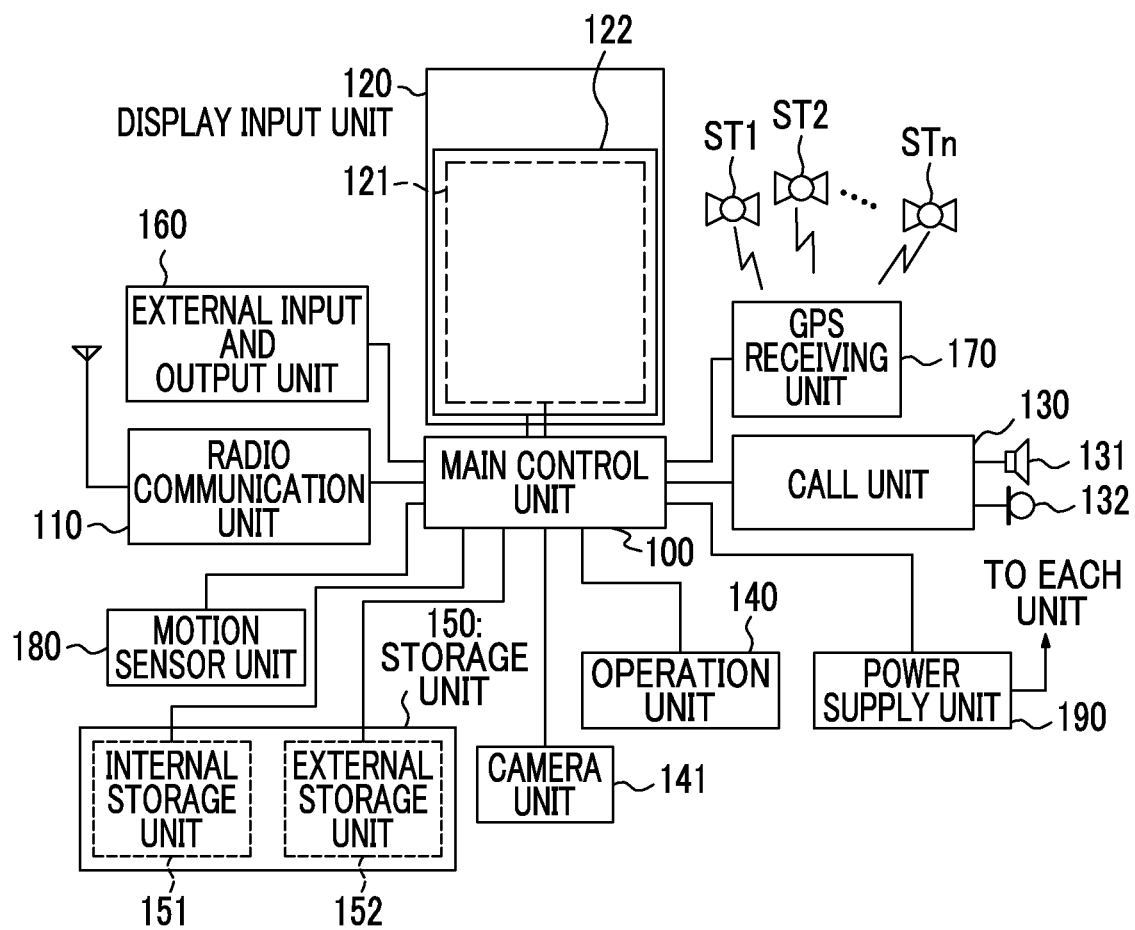
FIG. 13 is a block diagram showing the configuration of the smartphone shown in FIG. 12.

FIG. 13 is a block diagram showing the configuration of the smartphone 101 shown in FIG. 12. As shown in FIG. 13, a radio communication unit 110, the display input unit 120, a call unit 130, the operation unit 140, the camera unit 141, a storage unit 150, an external input and output unit 160, a global positioning system (GPS) receiving unit 170, a motion sensor unit 180, a power supply unit 190, and a main control unit 100 are provided as main components of the smartphone. As a main function, the smartphone 101 has a radio communication function for performing mobile radio communication through a base station BS and a mobile communication network NW.

The radio communication unit 110 performs radio communication with the base station BS accommodated in the mobile communication network NW according to the instruction of the main control unit 100. By using the radio communication, various kinds of file data such as audio data and image data, electronic mail data, and the like are transmitted and received, or Web data, streaming data, and the like are received.

The display input unit 120 is a so-called touch panel that displays images (a still image and a moving image), character information, and the like in order to visually transmit the information to the user and detects a user operation on the displayed information under the control of the main control unit 100, and includes the display panel 121 and the operation panel 122.

In the display panel 121, a liquid crystal display (LCD), an organic electro-luminescence display (OELD), or the like is used as a display device. The operation panel 122 is a device that is placed so that an image displayed on the display surface of the display panel 121 is visible and that detects one or more coordinates operated by a user's finger or a stylus. If the device is operated by a user's finger or a stylus, a detection signal generated due to the operation is output to the main control unit 100. Then, the main control unit 100 detects an operation position (coordinates) on the display panel 121 based on the received detection signal.

As shown in FIG. 12, the display panel 121 and the operation panel 122 of the smartphone 101 illustrated as an embodiment of the imaging apparatus of the present invention are integrated to form the display input unit 120. However, the operation panel 122 is disposed so as to completely cover the display panel 121. In a case where such an arrangement is adopted, the operation panel 122 may have a function of detecting a user operation even in a region outside the display panel 121. In other words, the operation panel 122 may include a detection region of an overlapping portion that overlaps the display panel 121 (hereinafter, referred to as a display region) and a detection region of the other outer outline portion that does not overlap the display panel 121 (hereinafter, referred to as a non-display region).

Although the size of the display region and the size of the display panel 121 may be completely the same, the size of the display region and the size of the display panel 121 may not necessarily be the same. The operation panel 122 may include two sensitive regions of an outer outline portion and the other inner portion. The width of the outer outline portion may be appropriately designed according to the size of the housing 102 or the like. In addition, as a position detection method adopted in the operation panel 122, a matrix switch method, a resistance film method, a surface acoustic wave method, an infrared method, an electromagnetic induction method, an electrostatic capacitance method, and the like can be mentioned, and it is possible to adopt any of the methods.

The call unit 130 includes the speaker 131 or the microphone 132. The call unit 130 converts the voice of the user, which is input through the microphone 132, into audio data that can be processed by the main control unit 100, and outputs the audio data to the main control unit 100. Alternatively, the call unit 130 decodes audio data received by the radio communication unit 110 or the external input and output unit 160, and outputs the audio data from the speaker 131. For example, as shown in FIG. 12, the speaker 131 can be mounted on the same surface as a surface on which the display input unit 120 is provided, and the microphone 132 can be mounted on the side surface of the housing 102.

The operation unit 140 is a hardware key using a key switch or the like, and receives an instruction from the user. For example, as shown in FIG. 12, the operation unit 140 is a push button type switch that is mounted on the side surface of the housing 102 of the smartphone 101 and that is turned on when pressed with a finger or the like and is turned off by the restoring force of the spring or the like when the finger is released.

The storage unit 150 stores a control program or control data of the main control unit 100, application software, address data in which the name, telephone number, and the like of the communications partner are associated with each other, transmitted or received e-mail data, Web data downloaded by Web browsing, or downloaded content data, and temporarily stores streaming data or the like. In addition, the storage unit 150 is formed by an internal storage unit 151 built in the smartphone and an external storage unit 152 having a detachable external memory slot. Each of the internal storage unit 151 and the external storage unit 152 that form the storage unit 150 is realized using storage media, such as a flash memory type memory, a hard disk type memory, a multimedia card micro type memory, a card type memory (for example, a MicroSD (registered trademark) memory), a random access memory (RAM), and a read only memory (ROM).

The external input and output unit 160 plays a role of interface with all external devices connected to the smartphone 101, and is directly or indirectly connected to other external devices through communication (for example, a universal serial bus (USB) or IEEE 1394) or a network (for example, the Internet, wireless LAN, Bluetooth (registered trademark), radio frequency identification (RFID), infrared data association (IrDA; registered trademark), Ultra Wideband (UWB; registered trademark), or ZigBee (registered trademark)).

Examples of the external device connected to the smartphone 101 include a wired/wireless headset, wired/wireless external charger, wired/wireless data port, a memory card or a subscriber identity module card (SIM)/user identity module card (UIM) card connected through a card socket, an external audio/video device connected through an audio/video input and output (I/O) terminal, an external audio/video device that is wirelessly connected, a smartphone that is connected in a wired/wireless manner, a personal computer that is connected in a wired/wireless manner, a PDA that is connected in a wired/wireless manner, and an earphone. Through the external input and output unit, data received from such an external device may be transmitted to each component inside the smartphone 101, or data inside the smartphone 101 may be transmitted to the external device.

The GPS receiving unit 170 receives GPS signals transmitted from GPS satellites ST1 to STn, performs positioning calculation processing based on the plurality of received GPS signals, and detects a position including the latitude, longitude, and altitude of the smartphone 101, according to the instruction of the main control unit 100. In a case where position information can be acquired from the radio communication unit 110 or the external input and output unit 160 (for example, a wireless LAN), the GPS receiving unit 170 can detect the position using the position information.

The motion sensor unit 180 includes, for example, a three-axis acceleration sensor, and detects the physical movement of the smartphone 101 according to the instruction of the main control unit 100. By detecting the physical movement of the smartphone 101, the movement direction or acceleration of the smartphone 101 is detected. The detection result is output to the main control unit 100.

The power supply unit 190 supplies electric power stored in a battery (not shown) to each unit of the smartphone 101 according to the instruction of the main control unit 100.

The main control unit 100 includes a microprocessor, operates according to the control program or control data stored in the storage unit 150, and performs overall control of the respective units of the smartphone 101. In addition, in order to perform voice communication or data communication through the radio communication unit 110, the main control unit 100 has a mobile communication control function for controlling each unit of the communication system and an application processing function.

The application processing function is realized by the operation of the main control unit 100 according to the application software stored in the storage unit 150. Examples of the application processing function include an infrared communication function for performing data communication with other devices by controlling the external input and output unit 160, an e-mail function for transmission and reception of an e-mail, a Web browsing function for browsing web pages, and the like.

The main control unit 100 has an image processing function of displaying a video on the display input unit 120 based on image data (data of a still image or a moving image), such as received data or downloaded streaming data. The image processing function refers to a function when the main control unit 100 decodes the above-described image data, performs image processing on the decoding result, and displays an image on the display input unit 120.

In addition, the main control unit 100 performs display control of the display panel 121 and operation detection control for detecting a user operation through the operation unit 140 and the operation panel 122.

By the execution of the display control, the main control unit 100 displays an icon for starting application software or a software key, such as a scroll bar, or displays a window for creating an e-mail. The scroll bar refers to a software key for receiving an instruction to move a display portion of, for example, a large image that cannot be fitted in the display region of the display panel 121.

In addition, by the execution of the operation detection control, the main control unit 100 detects a user operation through the operation unit 140, receives an operation on the above-described icon or an input of a character string to the input field of the above-described window through the operation panel 122, or receives a display image scroll request through the scroll bar.

In addition, by the execution of the operation detection control, the main control unit 100 has a touch panel control function for controlling the sensitive region of the operation panel 122 or the display position of a software key by determining whether the operation position of the operation panel 122 is an overlapping portion (display region) that overlaps the display panel 121 or the other outer outline portion (non-display region) that does not overlap the display panel 121.

The main control unit 100 can also detect a gesture operation on the operation panel 122 and execute a function set in advance in response to the detected gesture operation. The gesture operation does not mean a conventional simple touch operation, but means an operation of drawing a trajectory with a finger, an operation of designating a plurality of positions simultaneously, or an operation of drawing a trajectory for at least one of the plurality of positions by combining these.

The camera unit 141 is a digital camera that performs electronic imaging using an imaging element, such as a CMOS. In addition, the camera unit 141 can convert image data obtained by imaging into compressed image data, for example, JPEG image data, and can record the compressed image data in the storage unit 150 or output the compressed image data through the external input and output unit 160 or the radio communication unit 110, under the control of the main control unit 100. In the smartphone 101 shown in FIG. 12, the camera unit 141 is mounted on the same surface as the display input unit 120. However, the mounting position of the camera unit 141 is not limited thereto, and the camera unit 141 may be mounted on the back of the display input unit 120 or a plurality of camera units 141 may be mounted. In a case where a plurality of camera units 141 are mounted, it is possible to perform imaging using only one camera unit 141 provided for the imaging by switching the camera units 141, or it is possible to perform imaging using the plurality of camera units 141 simultaneously.

The camera unit 141 can be used for various functions of the smartphone 101. For example, an image acquired by the camera unit 141 can be displayed on the display panel 121, or an image of the camera unit 141 can be used as one of the operation inputs of the operation panel 122. In addition, when the GPS receiving unit 170 detects a position, it is possible to detect the position with reference to the image from the camera unit 141. By referring to the image from the camera unit 141, it is also possible to determine the direction of the optical axis of the camera unit 141 of the smartphone 101 or to determine the current use environment without using a three-axis acceleration sensor or in combination with the three-axis acceleration sensor. Needless to say, it is also possible to use the image from the camera unit 141 in the application software.

In addition, position information acquired by the GPS receiving unit 170, audio information (may be text information obtained by performing audio/text conversion with the main control unit or the like) acquired by the microphone 132, posture information acquired by the motion sensor unit 180, and the like can be added to the image data of a still image or a motion picture, and the result can be recorded in the storage unit 150 or can be output through the external input and output unit 160 or the radio communication unit 110.

The above-described image processing unit 35 (the filter processing control section 37, the first filter processing section 38, and the second filter processing section 39: refer to FIG. 3) can be realized by the main control unit 100, for example.

EXPLANATION OF REFERENCES

- 10: digital camera
- 12: lens unit
- 14: camera body
- 16: lens
- 17: diaphragm
- 18: optical system operation unit
- 20: lens unit controller
- 21: lens unit storage unit
- 22: lens unit input and output section
- 26: imaging element
- 28: body controller
- 29: user interface
- 30: camera body input and output unit
- 31: main body storage unit
- 32: input and output interface
- 34: device control unit
- 35: image processing unit
- 37: filter processing control section
- 38: first filter processing section
- 39: second filter processing section
- 40: signal processing section
- 42: first filter processing execution section
- 43: first filter processing multiplier
- 44: first filter processing adder
- 46: second filter processing execution section
- 47: second filter processing multiplier
- 48: second filter processing adder
- 52: automatic strength adjustment section
- 53: restoration filter selection section
- 54: second filter strength selection section
- 58: restoration filter storage unit
- 60: second filter strength list storage unit
- 61: first adder
- 62: second adder
- 63: sharpening adjustment section
- 65: non-linear processing section
- 67: first filter strength list storage unit
- 69: adjustment variable selection section
- 92: computer
- 93: computer input and output unit
- 94: computer controller
- 95: display
- 96: Internet
- 97: server
- 98: server input and output unit
- 99: server controller
- 100: main control unit
- 101: smartphone
- 102: housing
- 110: radio communication unit
- 120: display input unit
- 121: display panel
- 122: operation panel
- 130: call unit
- 131: speaker
- 132: microphone
- 140: operation unit
- 141: camera unit
- 150: storage unit
- 151: internal storage unit
- 152: external storage unit
- 160: external input and output unit

What is claimed is:

1. A signal processing device, comprising:
a signal processing circuit that adjusts a signal according to a frequency; and
a filter processing control circuit that controls the signal processing circuit,
wherein the signal processing circuit includes a first filter processing section that performs first filter processing and a second filter processing section that performs second filter processing having different frequency characteristics from the first filter processing, and
the filter processing control circuit acquires a total gain adjustment rate based on an adjustment magnification of a gain of the signal in the first filter processing and an adjustment magnification of a gain of the signal in the second filter processing, acquires the adjustment magnification in one of the first filter processing and the second filter processing, and calculates the adjustment magnification in the other one of the first filter processing and the second filter processing based on the total gain adjustment rate;
wherein the first filter processing is restoration processing using a restoration filter based on a point spread function, and
the restoration filter is determined based on imaging setting conditions in imaging and acquisition of the signal;
wherein the second filter processing is sharpening processing using, a sharpening filter.

2. The signal processing device according to claim 1, wherein the filter processing control circuit adjusts a ratio between the signals before and after the signal processing circuit to a response target ratio at a first frequency.

3. The signal processing device according to claim 2, wherein a frequency band where the signal is able to be adjusted overlaps at least partly between the first filter processing and the second filter processing, and
a frequency indicating a peak of the gain is different between the first filter processing and the second filter processing.

4. The signal processing device according to claim 2,
wherein the first filter processing includes processing for applying a first filter to the signal and processing for adjusting a magnification of a gain of the signal, which is obtained by application of the first filter, based on the adjustment magnification, and the second filter processing includes processing for applying a second filter to the signal and processing for adjusting a magnification of a gain of the signal, which is obtained by application of the second filter, based on the adjustment magnification.

5. The signal processing device according to claim 1,
wherein a frequency band where the signal is able to be adjusted overlaps at least partly between the first filter processing and the second filter processing, and a frequency indicating a peak of the gain is different between the first filter processing and the second filter processing.

6. The signal processing device according to claim 1,
wherein the first filter processing includes processing for applying a first filter to the signal and processing for adjusting a magnification of a gain of the signal, which is obtained by application of the first filter, based on the adjustment magnification, and the second filter processing includes processing for applying a second filter to the signal and processing for adjusting a magnification of a gain of the signal, which is obtained by application of the second filter, based on the adjustment magnification.

7. The signal processing device according to claim 1,
wherein the filter processing control circuit determines the adjustment magnification in the first filter processing based on an external input parameter, and calculates the adjustment magnification in the second filter processing based on the adjustment magnification in the first filter processing and the total gain adjustment rate.

8. The signal processing device according to claim 1,
wherein the first filter processing section and the second filter processing section are provided in parallel, the signal is input to the first filter processing section and the second filter processing section, and increment or decrement data of the signal due to the first filter processing and increment or decrement data of the signal due to the second filter processing are added together.

9. The signal processing device according to claim 1,
wherein the first filter processing section and the second filter processing section are provided in series, and the signal is subjected to one of the first filter processing and the second filter processing and is then subjected to the other processing.

10. The signal processing device according to claim 1,
wherein at least any one of the first filter processing section or the second filter processing section includes a non-linear processing section that performs non-linear processing of the signal.

11. The signal processing device according to claim 10,
wherein the non-linear processing is clipping processing for adjusting a signal value exceeding a clip threshold value of the signal to the clip threshold value, and the filter processing control circuit determines the adjustment magnification in at least any one of the first filter processing or the second filter processing according to the clip threshold value.

12. The signal processing device according to claim 11,
wherein the adjustment magnification in at least one of the first filter processing and the second filter processing is determined based on imaging setting conditions in imaging and acquisition of the image signal.

13. The signal processing device according to claim 1,
wherein at least any one of the first filter processing or the second filter processing is low pass filter processing.

14. The signal processing device according to claim 1,
wherein the signal is an image signal.

15. A parameter generating method using the imaging apparatus according to claim 1 for generating a parameter used in an image processing unit circuit which includes a signal processing unit circuit that adjusts a signal according to a frequency and a filter processing control circuit that controls the signal processing circuit and in which the signal processing circuit includes a first filter processing section that performs first filter processing and a second filter processing section that performs second filter processing and frequency characteristics are different between the first filter processing and the second filter processing, the method comprising:

a step of acquiring a total gain adjustment rate based on an adjustment magnification of a gain of the signal in the first filter processing and an adjustment magnification of a gain of the signal in the second filter processing; and a step of acquiring the adjustment magnification in one of the first filter processing and the second filter processing and calculating the adjustment magnification in the other one of the first filter processing and the second filter processing based on the total gain adjustment rate;

wherein the first filter processing is restoration processing using a restoration filter based on a point spread function, and the restoration filter is determined based on imaging setting conditions in imaging and acquisition of the signal;

wherein the second filter processing is sharpening processing using a sharpening filter.

16. A signal processing method, comprising:
a signal adjustment step of adjusting a signal according to a frequency, the signal adjustment step including a first filter processing step of performing first filter processing and second filter processing step for performing second filter processing having different frequency characteristics from the first filter processing;

a step of acquiring a total gain adjustment rate based on an adjustment magnification of a gain of the signal in the first filter processing and an adjustment magnification of a gain of the signal in the second filter processing; and a step of acquiring the adjustment magnification in one of the first filter processing and the second filter processing and calculating the adjustment magnification in the other one of the first filter processing and the second filter processing based on the total gain adjustment rate;

wherein the first filter processing is restoration processing using a restoration filter based on a point spread function, and the restoration filter is determined based on imaging setting conditions in imaging and acquisition of the signal;

wherein the second filter processing is sharpening processing using a sharpening filter.

17. A non-transitory computer readable medium storing a program causing a computer to execute:
a procedure of adjusting a signal according to a frequency, the procedure including a step of performing first filter processing and a step of performing second filter processing having different frequency characteristics from the first filter processing;

a procedure of acquiring a total gain adjustment rate based on an adjustment magnification of a gain of the signal in the first filter processing and an adjustment magnification of a gain of the signal in the second filter processing; and a procedure of acquiring the adjustment magnification in one of the first filter processing and the second filter processing and calculating the adjustment magnification in the other one of the first filter processing and the second filter processing based on the total gain adjustment rate;

wherein the first filter processing is restoration processing using a restoration filter based on a point spread function, and the restoration filter is determined based on imaging setting conditions in imaging and acquisition of the signal;

wherein the second filter processing is sharpening processing using a sharpening filter.

\* \* \* \* \*